US008844959B2

(12) United States Patent
Winter, V et al.

(10) Patent No.: US 8,844,959 B2
(45) Date of Patent: Sep. 30, 2014

(54) WHEELCHAIR WITH LEVER DRIVETRAIN

(75) Inventors: Amos G. Winter, V, Chesterfield, NH (US); Mario A. Bollini, Sterling Heights, MI (US); Danielle M. DeLatte, Ellicott City, MD (US); Harrison F. O'Hanley, Ipswich, MA (US); Natasha K. Scolnik, Washington, DC (US); Gwyndaf M. Jones, Carlisle, MA (US); Daniel D. Frey, Natick, MA (US); Benjamin Judge, Tewksbury, MA (US); Benjamin H. Gallup, Norfolk, MA (US); Danielle Hicks, Modesto, CA (US); Nydia Ruleman, Germantown, TN (US); Xuefeng Chen, Burke, VA (US)

(73) Assignee: Global Research Innovation and Technology L3C, Boston, MA (US)

( * ) Notice: Subject to any disclaimer, the term of this patent is extended or adjusted under 35 U.S.C. 154(b) by 0 days.

(21) Appl. No.: 13/158,183

(22) Filed: Jun. 10, 2011

(65) Prior Publication Data
US 2013/0062857 A1    Mar. 14, 2013

Related U.S. Application Data

(63) Continuation of application No. 12/914,986, filed on Oct. 28, 2010, now abandoned.

(60) Provisional application No. 61/255,848, filed on Oct. 28, 2009.

(51) Int. Cl.
*B62M 1/16* (2006.01)
*B62M 3/00* (2006.01)

(52) U.S. Cl.
CPC ...................................... *B62M 3/00* (2013.01)
USPC .......................................................... 280/244

(58) Field of Classification Search
CPC ........... A61G 5/025; B62M 1/14; B62M 1/16
USPC .............. 280/242.1, 244, 245, 246, 247, 248, 280/250.1
See application file for complete search history.

(56) References Cited

U.S. PATENT DOCUMENTS 3,994,509 A * 11/1976 Schaeffer ................... 280/250.1
6,276,703 B1 * 8/2001 Caldwell .................... 280/242.1
(Continued)

FOREIGN PATENT DOCUMENTS

GB          2 456 077         7/2009
WO          2008033360        3/2008
WO     WO 2008033360 A2 *    3/2008

OTHER PUBLICATIONS http://wwww.cimit.org/forum-education-02-09-10-team1.html.

(Continued)

*Primary Examiner* — Joseph M Rocca
*Assistant Examiner* — Felicia L Brittman
(74) *Attorney, Agent, or Firm* — Greenberg Traurig, LLP; Chinh H. Pham

(57) ABSTRACT

A manually powered wheelchair includes a first lever associated with a first rear wheel and demountably coupled to a first drivetrain, the first lever having a first brake thereon. The wheelchair also includes a second lever associated with a second rear wheel and demountably coupled to a second drivetrain, the second lever having a second brake thereon. Each drivetrain includes a chainring, a chain, and a freewheel, and each drivetrain has a fixed gear ratio. The freewheel of each drivetrain is actuated by manual pivoting of the lever associated therewith. In use, the wheelchair achieves changes in mechanical advantage when a user shifts the user's hands up and down the first and second levers.

29 Claims, 25 Drawing Sheets

(56) References Cited

U.S. PATENT DOCUMENTS

| | | | |
|---|---|---|---|
| 6,371,502 B1* | 4/2002 | Howlett et al. | 280/304.1 |
| 7,584,976 B2 | 9/2009 | Bayne et al. | |
| 7,900,945 B1 | 3/2011 | Rackley | |
| 2002/0067019 A1* | 6/2002 | Brown | 280/250.1 |
| 2005/0067807 A1 | 3/2005 | Harcourt et al. | |
| 2006/0226628 A1* | 10/2006 | Lindsay et al. | 280/250 |
| 2007/0108721 A1 | 5/2007 | Bayne et al. | |
| 2010/0038880 A1 | 2/2010 | Bagg | |

OTHER PUBLICATIONS http://www.wijit.com.
http://riomobility.com/en/leverdrive/index.htm.
http://willgowheelcharis.com/.
http://www.nu-drive.com/.
http://www.mountaintrike.com/.
http://renegadewheelchairs.com/.
http://web.mit.edu/holton/www/personal/rowchair/rowchair.html.

* cited by examiner

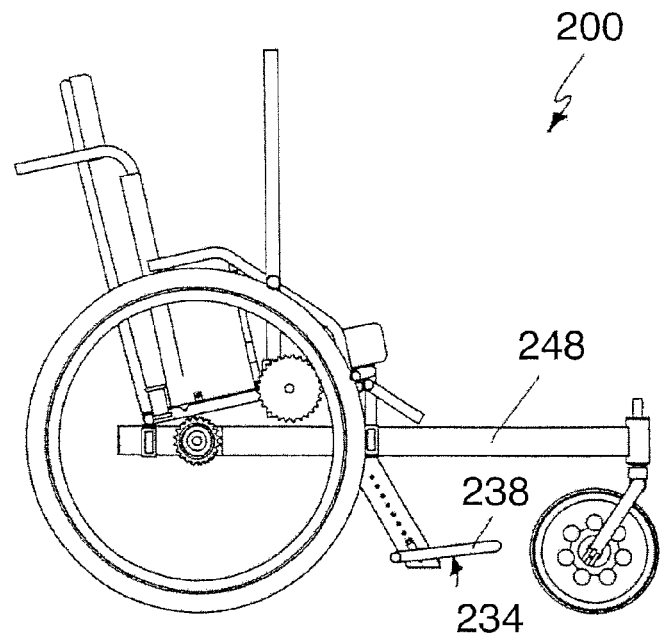
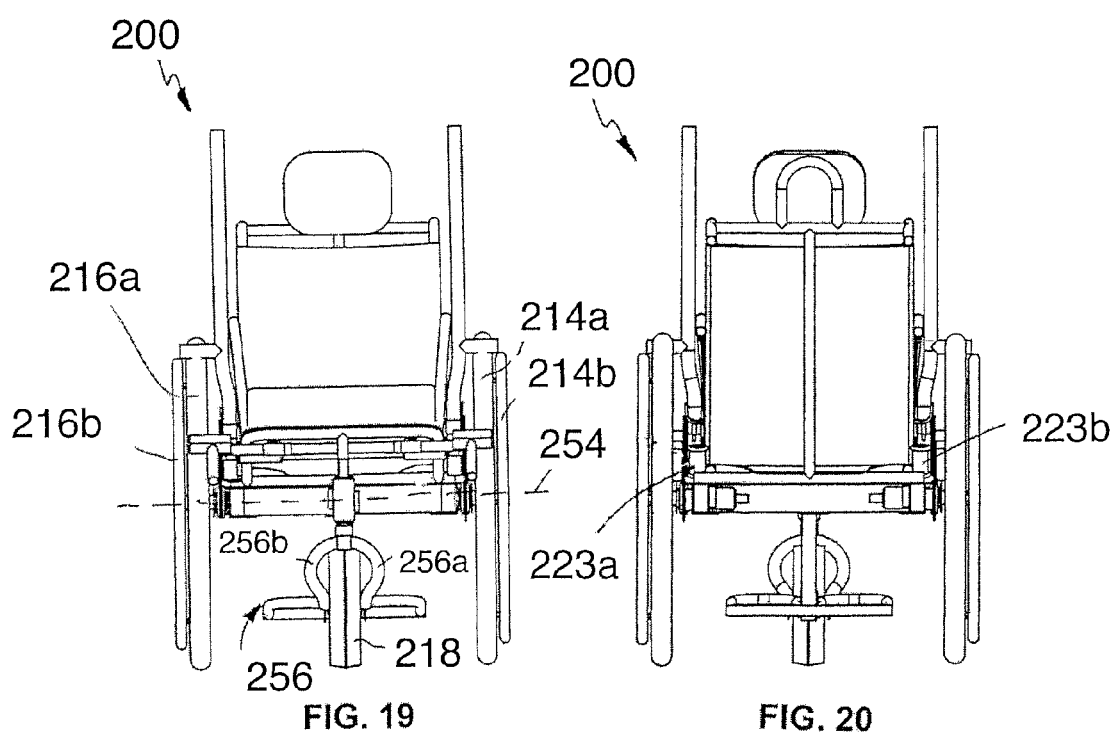

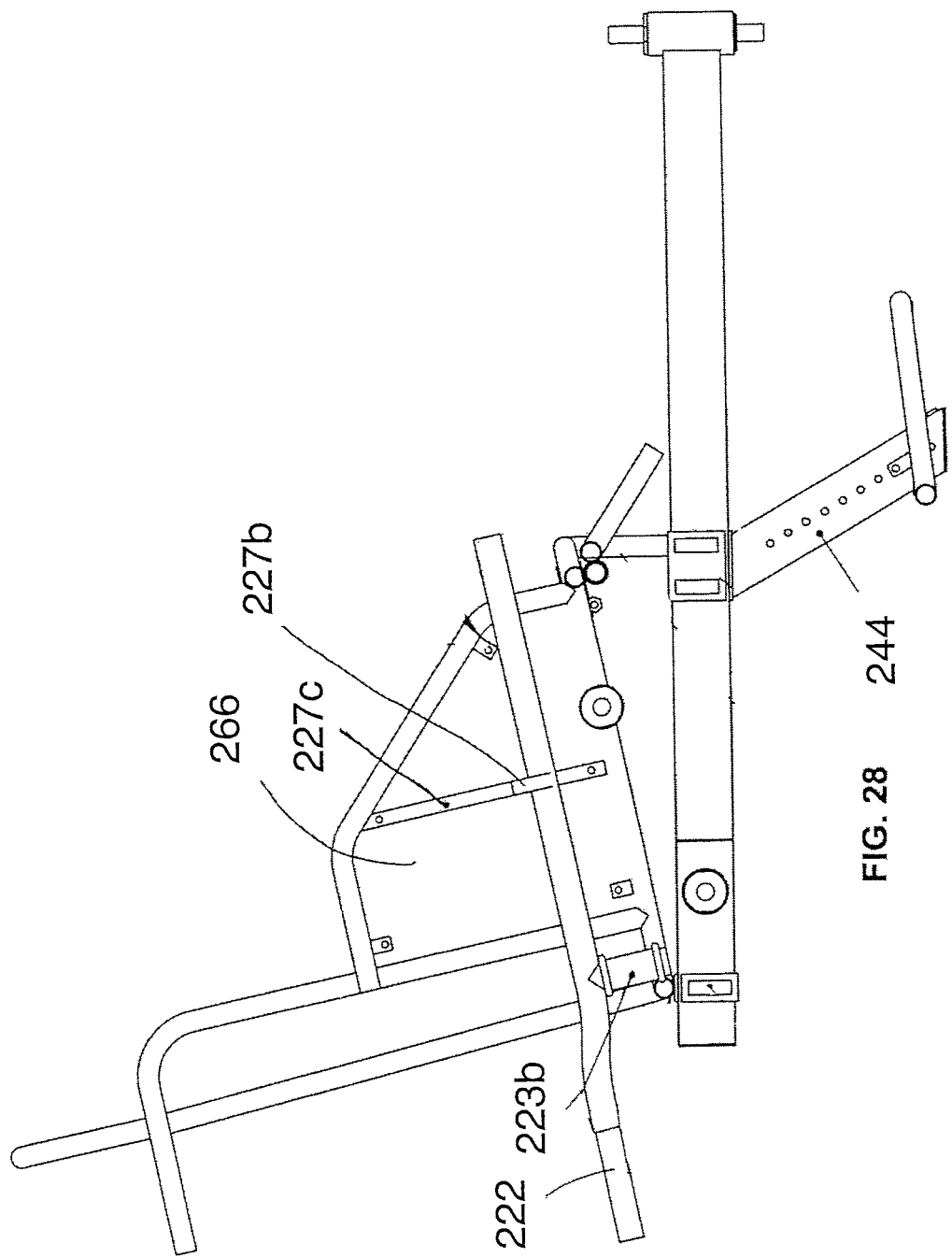

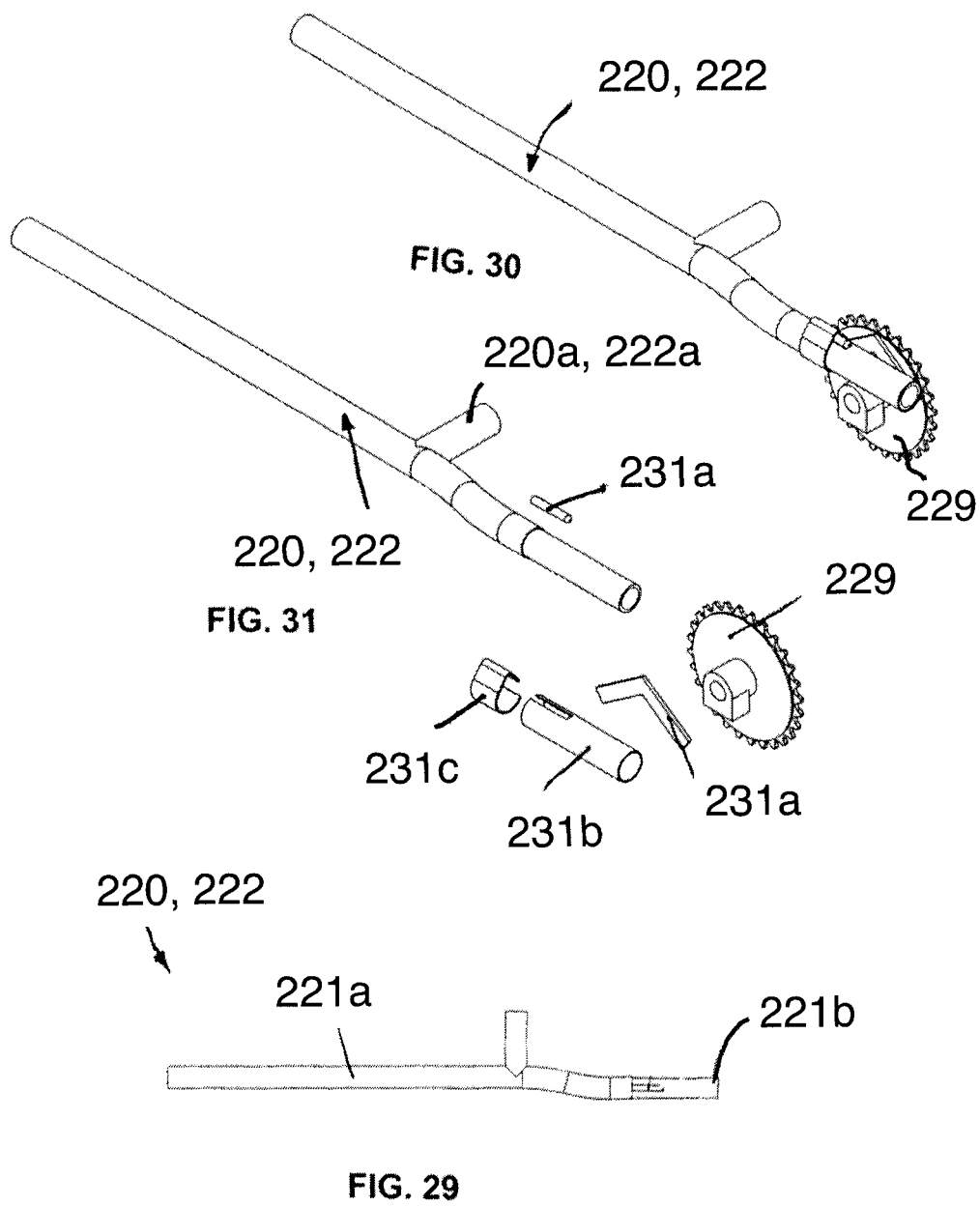

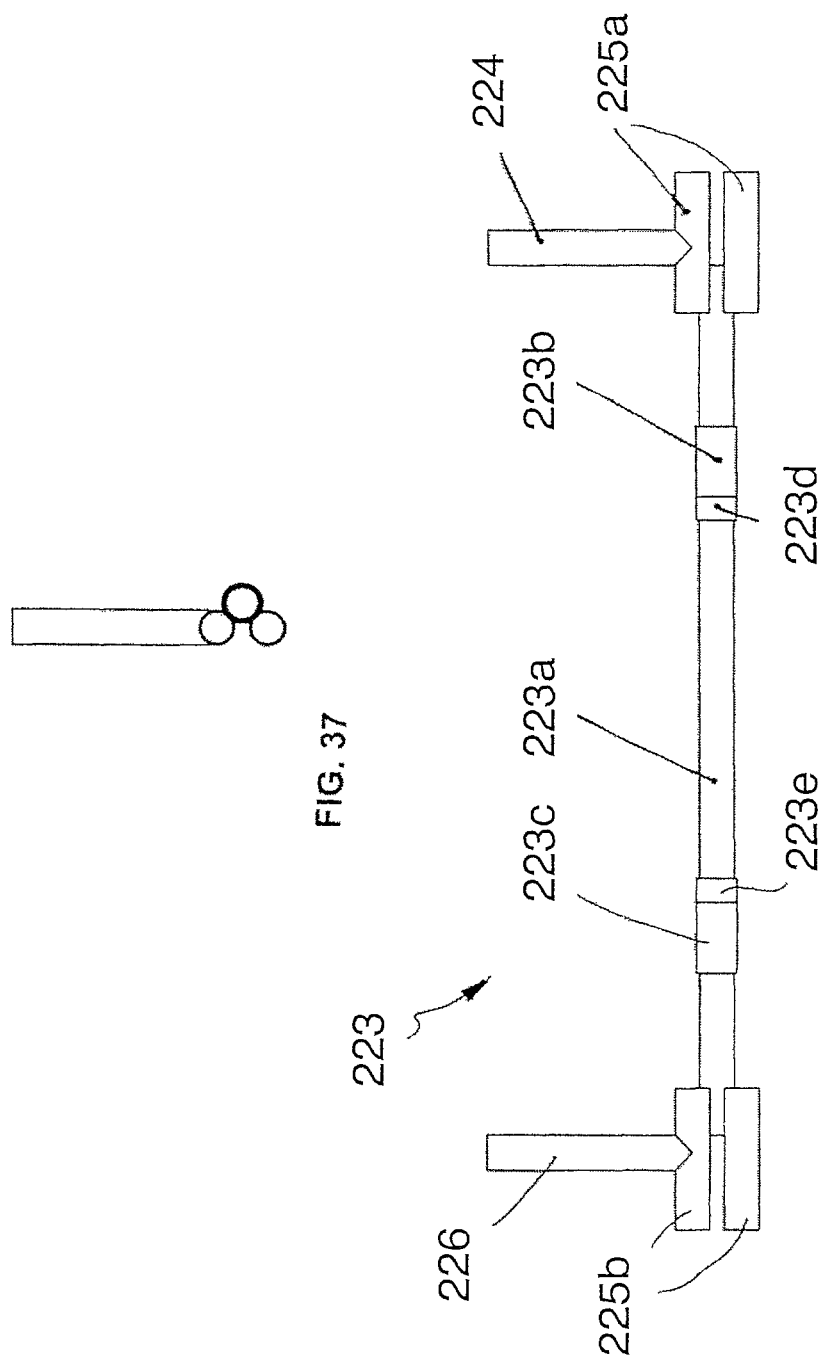

WHEELCHAIR WITH LEVER DRIVETRAIN

CROSS-REFERENCE TO RELATED APPLICATIONS

This application is a continuation of U.S. patent application Ser. No. 12/914,986 filed Oct. 28, 2010 now abandoned and entitled "Wheelchair with Lever Drivetrain" and further claims the benefits of U.S. Provisional Application No. 61/255,848 filed Oct. 28, 2009 and entitled "Wheelchair with Lever Drivetrain" under 35 U.S.C. §119(e), and the entire contents of these applications are expressly incorporated herein by reference thereto.

FIELD OF THE INVENTION

The invention relates to a wheelchair. More particularly, the invention relates to a wheelchair with a lever drivetrain.

BACKGROUND OF THE INVENTION

In some areas of the world such as developing countries, there is a particular need for technology to assist in providing mobility to people with disabilities, regardless of their location, travel requirements, or local environment. It has been estimated, for example, that 20 million people in the developing world require a wheelchair (*Annual Program Statement*. USAID, 2003), yet wheelchairs are only available to about five percent of those in need (Warner, D., *Nothing About Us Without Us: Developing Innovative Technologies For, By and With Disabled Persons*, 1998). About seventy percent of disabled people in the developing world live in rural areas, such that the availability of public transportation is minimal (Groce, N. E., *Health beliefs and behaviour towards individuals with disability cross-culturally*. Introduction to Cross-Cultural Rehabilitation: An International perspective, 1999). People with disabilities are profoundly affected by the lack of access to mobility aids. For example, ninety-eight percent of children with disabilities in developing countries do not attend school (*People with disabilities*. UNESCO Bangkok, 2003. IV(APPEAL)). Moreover, discrimination in the developing world has even resulted in double-charging for bus fares, simply due to an alleged added transportation cost for a wheelchair (Amos G. Winter, V., *Assessment of Wheelchair Technology in Tanzania*. The International Journal of Service Learning in Engineering, 2006. 1(2): p. 60-77). In short, the ability of disabled individuals in the developing world to travel to a job and even to be a functional member of their society is limited by the lack of readily available mobility aids.

Conventional, western-style wheelchairs have limited usefulness to the disabled in developing countries. These wheelchairs are inefficient to propel and can be exhausting to use over long distances and on the rough terrain typical in such countries. Furthermore, these wheelchairs are most often manufactured abroad with components that are not locally-available, and thus once a part on the wheelchair breaks or exhausts its expected service life, the original part cannot be readily replaced (if at all) with a spare or replacement part. It has even been found that locally-manufactured wheelchairs still employ custom and relatively expensive components that prevent would-be purchasers from owning them.

Thus, there is a need for a wheelchair-based mobility aid that can be readily manufactured throughout the world using off-the-shelf parts, such as bicycle parts, yet be functional and operational on varied terrain ranging from steep hills to sandy roads to muddy walking paths to home-based situations. There also is a need for a wheelchair-based mobility aid with enhanced performance breadth for users in developed countries.

SUMMARY OF THE INVENTION

In an exemplary embodiment, a manually powered wheelchair includes a first lever associated with a first rear wheel and demountably coupled to a first drivetrain, the first lever having a first brake thereon, and also includes a second lever associated with a second rear wheel and demountably coupled to a second drivetrain, the second lever having a second brake thereon. Each drivetrain includes a chainring, a chain, and a freewheel, and each drivetrain has a fixed gear ratio. The freewheel of each drivetrain is actuated by manual pivoting of the lever associated therewith.

In some exemplary embodiments, the wheelchair further includes a single front wheel. Also, the first lever may be pivotable so that the first brake may contact the first wheel, and the second lever may be pivotable so that the second brake may contact the second wheel. A separate axle may be provided for each of the first and second rear wheels. The freewheel may have 18 or 20 teeth and the chainring may have 28 or 36 teeth, respectively. The drivetrains may permit a 4:1 or a 3:1 change in mechanical advantage. The wheelchair may further include a footrest. In addition, the first and second rear wheels may be disposed parallel to one another. A wheelbase of between about 60 cm and about 80 cm may be provided between a front wheel and the rear wheels.

The wheelchair may further include a back pad configured and dimensioned for being disposed between shoulder blades of a user of the wheelchair. The wheelchair may include a seat frame that is tapered such that the seat frame is wider proximate a user's hips than proximate the user's legs. In some embodiments, the wheelchair may include a first cylinder for receiving the first brake and a first bracket for supporting a first main body of the first lever, as well as a second cylinder for receiving the second brake and a second bracket for supporting a second main body of the second lever.

In an exemplary method of operating a wheelchair, with the wheelchair having a first lever associated with a first rear wheel and demountably coupled to a first drivetrain, the first lever having a first brake thereon, and the wheelchair further having a second lever associated with a second rear wheel and demountably coupled to a second drivetrain, the second lever having a second brake thereon, the method may include: changing hand position on the levers to change mechanical advantage.

The method may further include: moving hand position closer to a pivot point associated with the first lever to increase speed achieved by a power stroke. In addition, the method may include: moving hand position away from a pivot point associated with the first lever to increase torque at the first wheel. Hand position may be set over lever lengths between about 20 cm and about 86 cm, or between about 20 cm and about 60 cm. A wheelbase of between about 50 cm and about 80 cm may be provided between a front wheel and the rear wheels. The drivetrains may permit a 4:1 or 3:1 change in mechanical advantage. Each drivetrain may have a fixed gear ratio. In addition, a freewheel may be actuated by manual pivoting of the first lever. In the method, the wheelchair may be moved by differentially powering at least one of the levers or applying at least one of the brakes.

BRIEF DESCRIPTION OF THE DRAWINGS

Preferred features of embodiments are disclosed in the accompanying drawings, wherein:

FIG. 18 is a side view of the wheelchair of FIG. 17;

FIG. 19 is a front view of the wheelchair of FIG. 17;

FIG. 20 is a back view of the wheelchair of FIG. 17;

FIG. 28 shows a side view of the frame assembly of the wheelchair of FIG. 17;

FIG. 29 shows a side view of a lever of the wheelchair of FIG. 17;

FIG. 30 shows a side perspective view of the lever and coupling assembly of the wheelchair of FIG. 17;

FIG. 31 shows an exploded side perspective view of the lever and coupling assembly of the wheelchair of FIG. 17;

FIG. 36 shows a front view of the parking brake of the wheelchair of FIG. 17; and FIG. 37 shows a side view of the parking brake linkage of the wheelchair of FIG. 17.

DETAILED DESCRIPTION OF THE PREFERRED EMBODIMENTS

Figure 1:
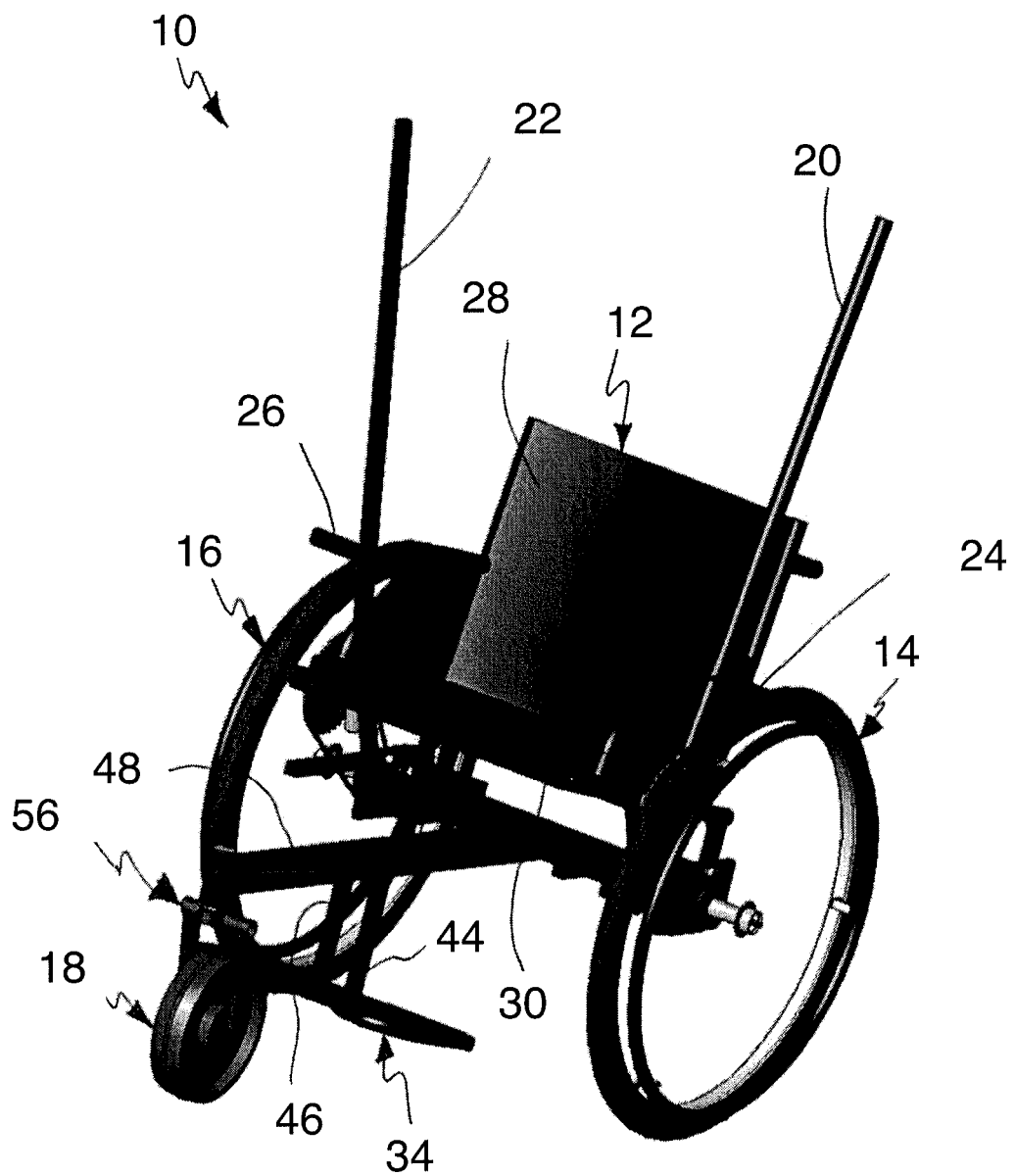
FIG. 1 is a perspective view of a first embodiment of a wheelchair with lever drivetrain according to an exemplary embodiment.
Figure 6:
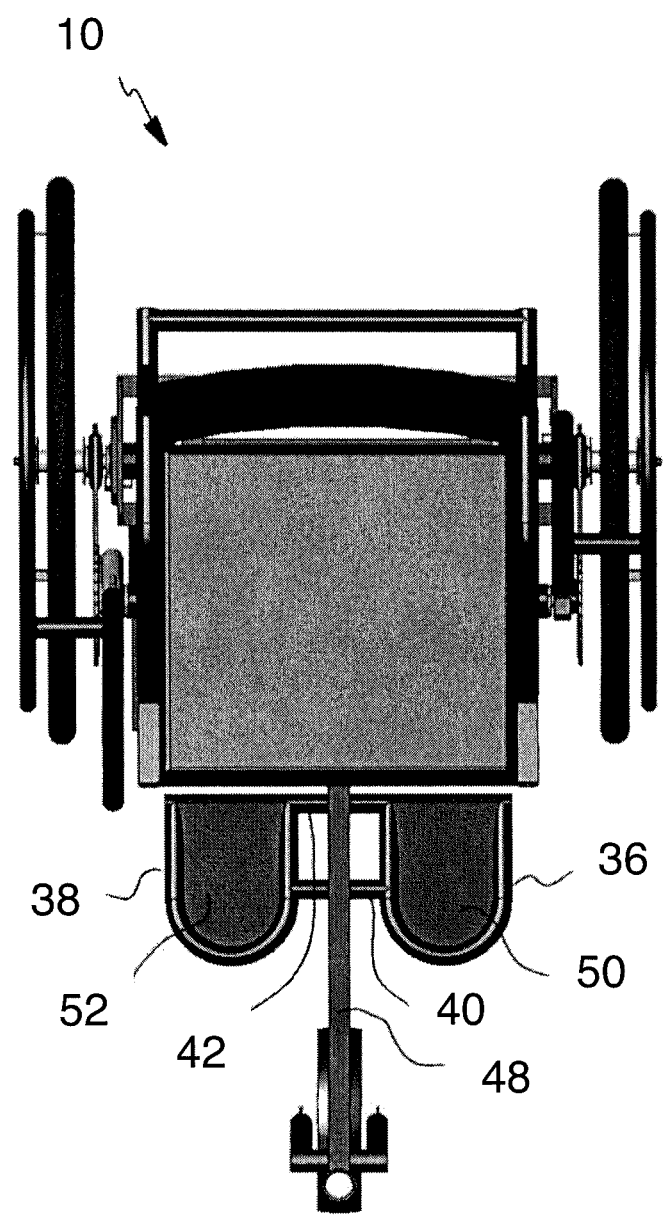
FIG. 6 is a top view of the wheelchair of FIG. 1.
Figure 7:
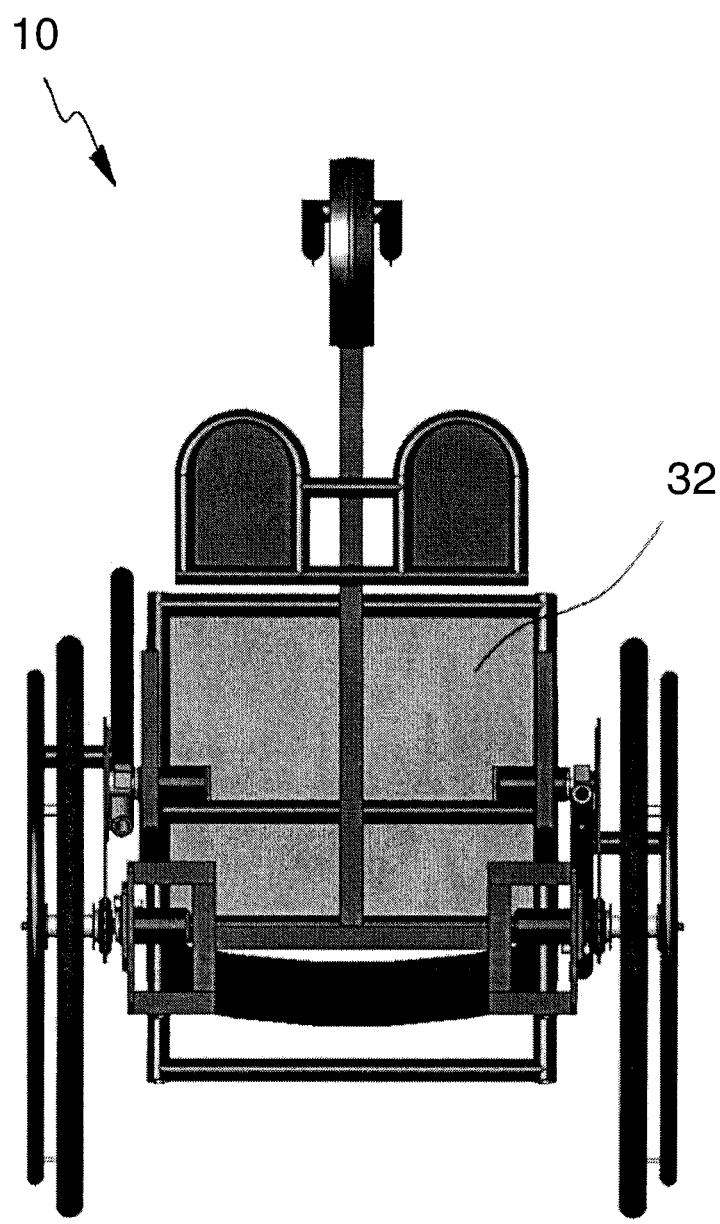
FIG. 7 is a bottom view of the wheelchair of FIG. 1.
Figure 8:
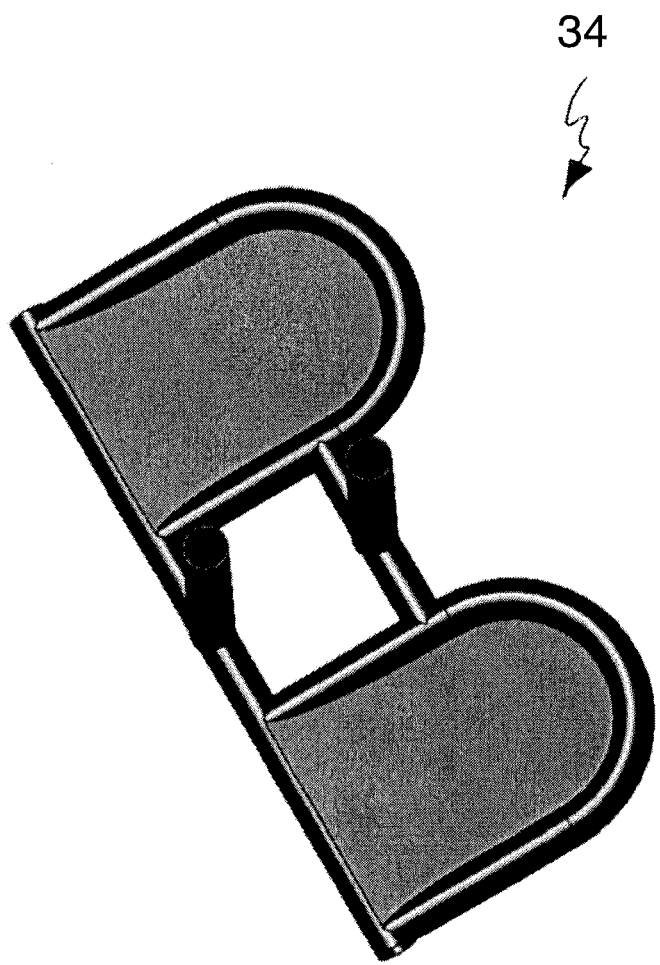
FIG. 8 shows a top perspective view of the foot rest of the wheelchair of FIG. 1.
Figure 9:
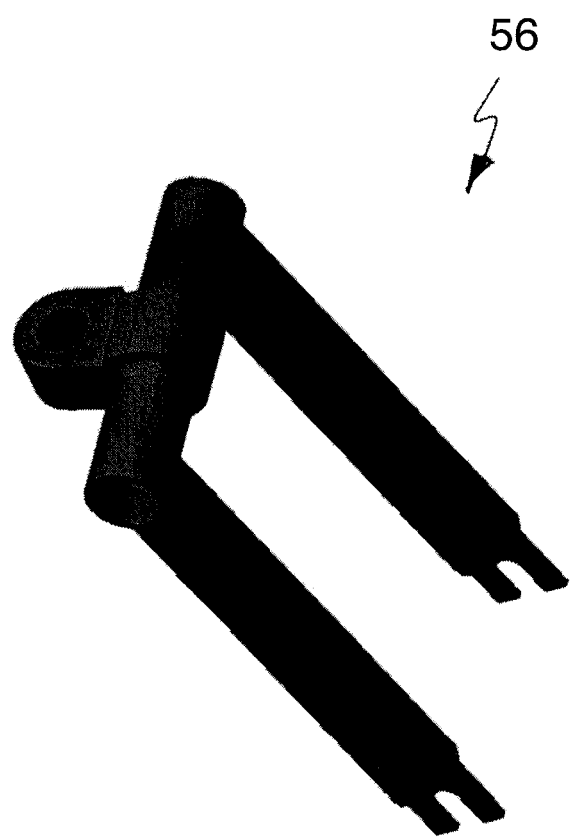
FIG. 9 shows a top perspective view of the fork used with the front wheel of the wheelchair of FIG. 1.

Turning to FIG. 1, an exemplary embodiment of a wheelchair 10 is shown. Wheelchair 10 has a seat 12, rear wheels 14, 16, and a front wheel 18. The drivetrain of wheelchair 10 includes a pair of levers 20, 22 for hand operation. Each lever 20, 22 includes a brake 24, 26, respectively, for frictionally engaging a wheel 14, 16, respectively. Although not shown, in an exemplary preferred embodiment, wheels 14, 16 may include spokes. Seat 12 may include a back portion 28 and a cushion portion 30 which may be disposed on a rigid plate 32 as shown in FIG. 7. A foot rest 34 for example may be formed of a pair of U-shaped tubes 36, 38 coupled to each other with a pair of cross-brace tubes 40, 42, as shown in FIG. 6. In alternate embodiments, tubes 36, 38 instead each may form a V-shape, an O-shape, a square or other rectangular shape, or another shape. Front and rear footrest standoffs 44, 46, respectively, couple cross-brace tubes 40, 42 to central member 48. Foot rest plates 50, 52 are configured and dimensioned to be coupled to U-shaped tubes 36, 38, respectively. As shown for example in FIGS. 3, 4, the frame of foot rest 34 is disposed at an angle transverse to central member 48, although plates 50, 52 may be disposed parallel to the ground. In alternate embodiments, tubes 44, 46 may be replaced with a linkage or coupling to adjust footrest position.

In the preferred, exemplary embodiment, wheelchair 10 has a total of three wheels: rear wheels 14, 16, and front wheel 18. Wheel 14 may include tire 14a and hand rim 14b, while wheel 16 similarly may include tire 16a and hand rim 16b. Hand rims 14b, 16b may be grasped by a user sitting in wheelchair 10 to turn wheels as is generally known in the art. Preferably, wheels 14, 16 are disposed parallel to one another perpendicular to rotation axis 54 and preferably are 26 inch diameter mountain bike tires. Other alternate embodiments may include cambered wheels, as is common on wheelchairs. Wheel 18 may be an 8 inch or 10 inch diameter castor (in which a hub such as a bicycle hub may be disposed to serve as the bearing for front wheel 18), and preferably is secured by a fork 56 that may include parallel legs 56a, 56b coupled with a fork top 56c which in turn is provided with 360° of swivel movement about crank arm connection 58 disposed on swivel axis 58a. An end of crank arm connection 58 preferably is welded to fork 56. The three points of ground contact provided by rear wheels 14, 16 and front wheel 18 advantageously provide stability to wheelchair 10 on rough terrain and thus resistance to tipping, as compared to a design optionally with a fourth wheel. A wheelchair with four wheels theoretically has four points of contact with the ground. However, if one wheel is off the ground while on rough terrain, such a wheelchair acts like a table with one short leg and thus is unstable. Preferably, wheel 18 is disposed a sufficient distance on member 48 from axis 54 about which wheels 14, 16 rotate, such that wheelchair 10 is stable. For example, distance L1, shown in FIG. 4, may be 77.5 cm, providing a long "wheelbase" for stability and also for decreasing the loading on front wheel 18.

Figure 3:
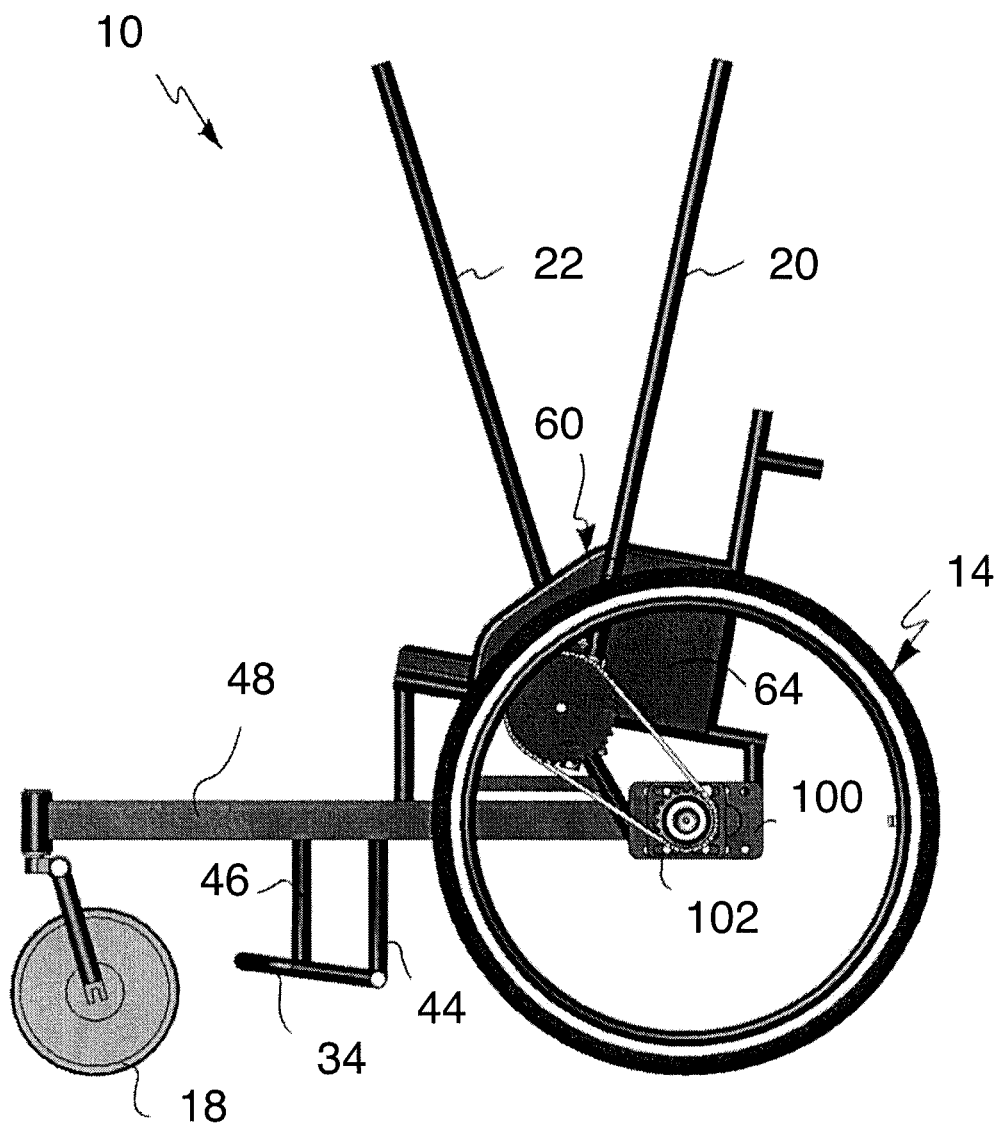
FIG. 3 is a first side view of the wheelchair of FIG. 1.
Figure 4:
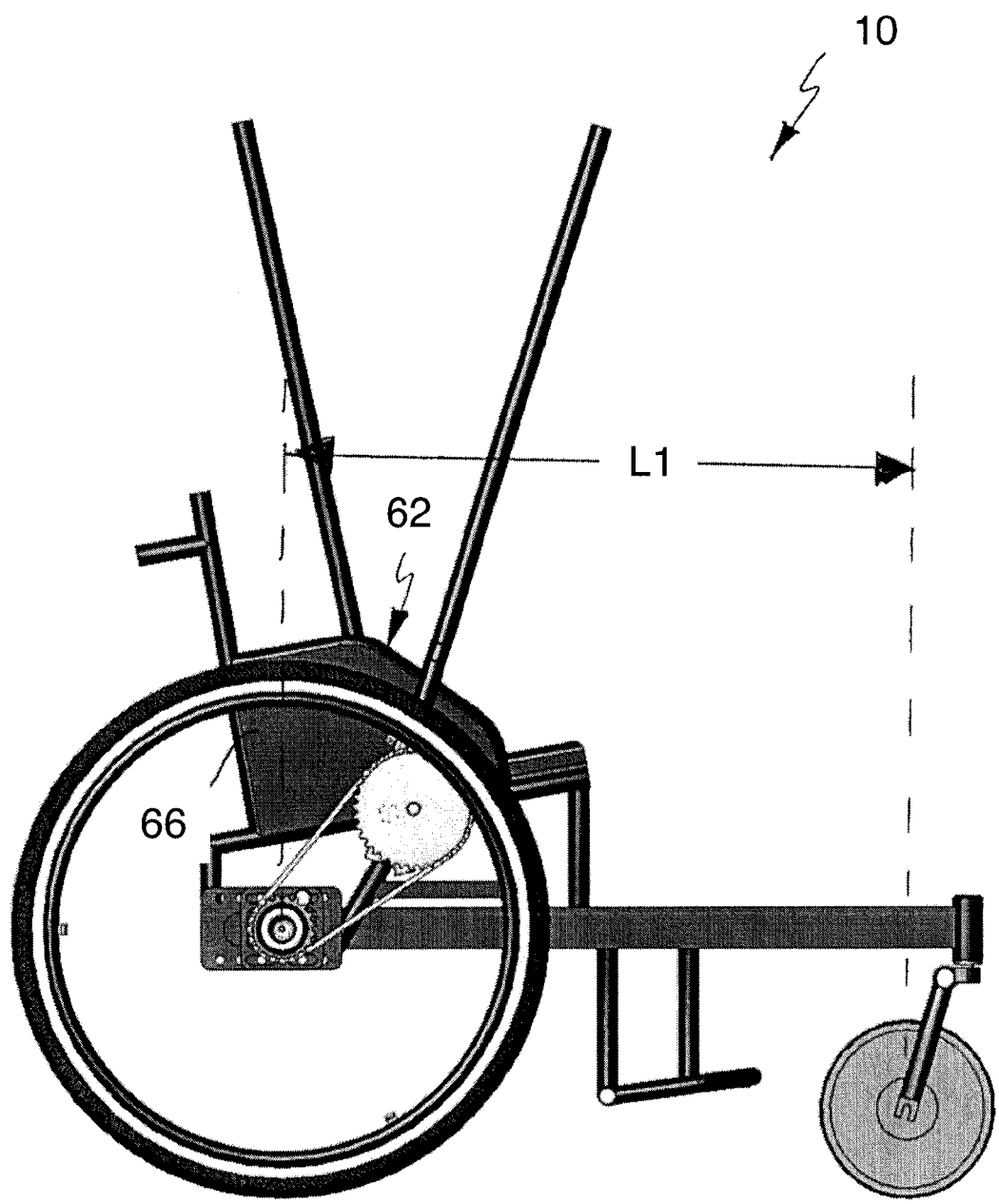
FIG. 4 is a second side view of the wheelchair of FIG. 1.
Figure 5:
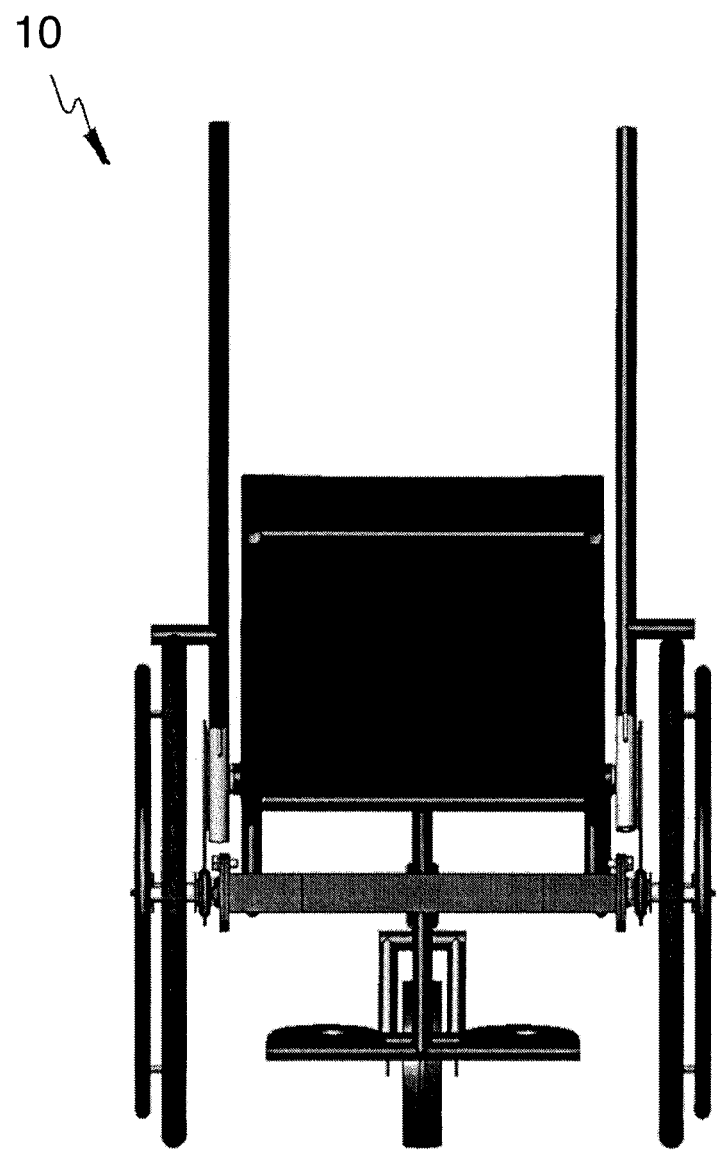
FIG. 5 is a back view of the wheelchair of FIG. 1.

Wheelchair 10 may further include arm rests 60, 62 as well as respective mud guards 64, 66, as shown in FIGS. 3 and 4.

Figure 2:
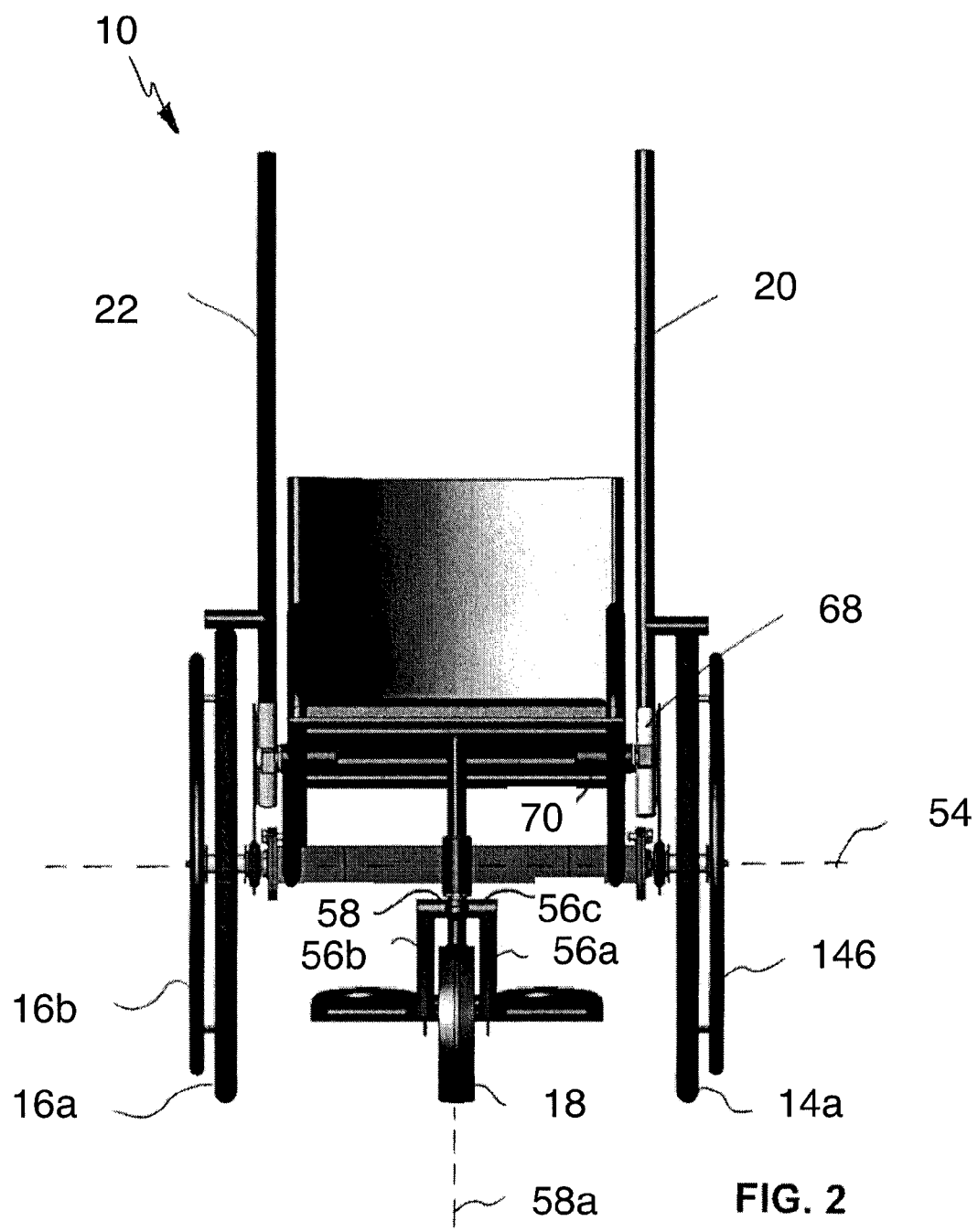
FIG. 2 is a front view of the wheelchair of FIG. 1.
Figure 10:
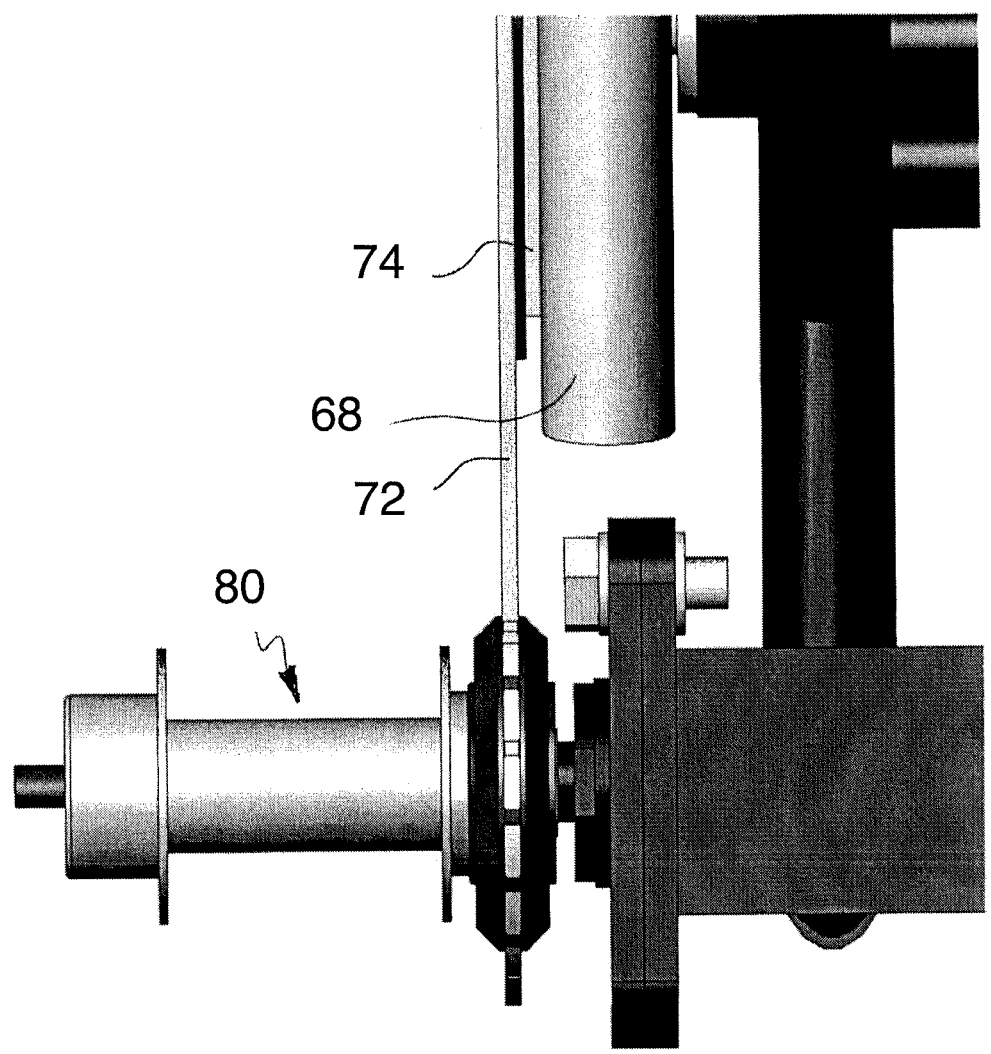
FIG. 10 shows a side view of portions of portions of the lever assembly and rear hub assembly of the wheel chair of FIG. 1.
Figure 11:
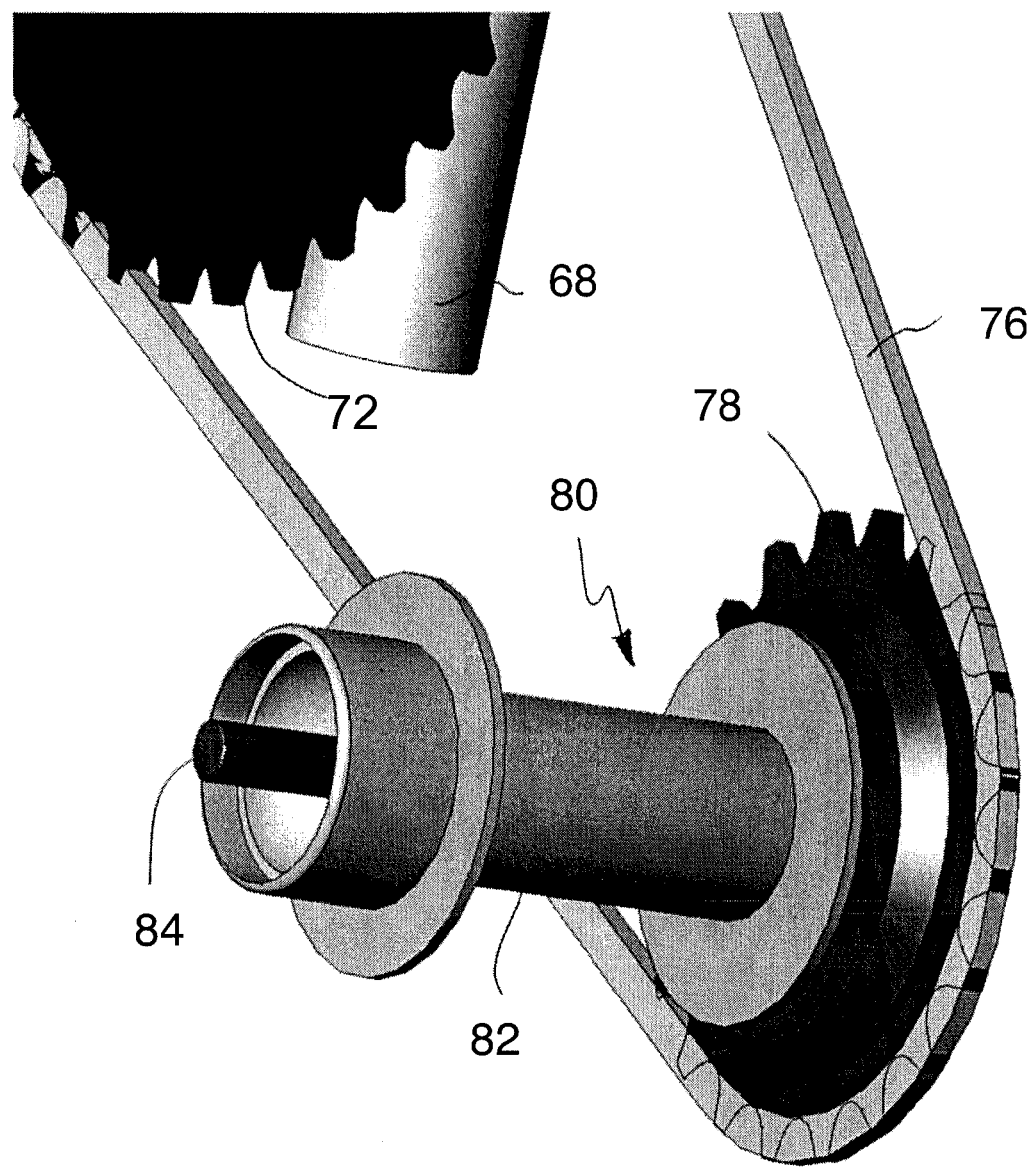
FIG. 11 shows a side perspective view of the lever assembly and rear hub assembly of the wheelchair of FIG. 1.
Figure 12:
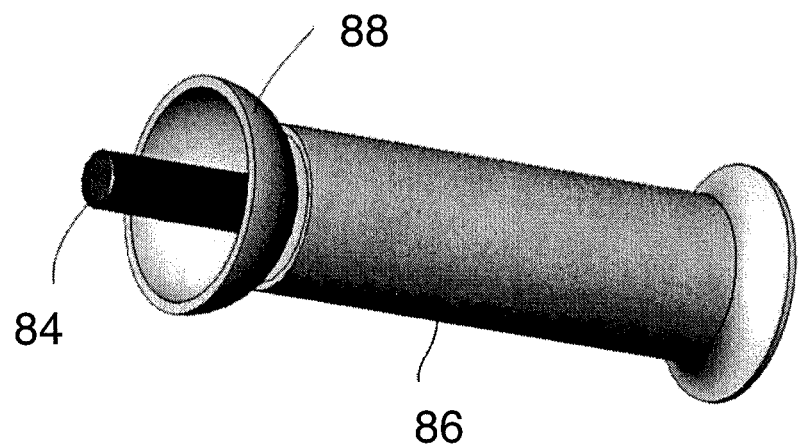
FIG. 12 shows a side perspective view of a portion of the rear hub assembly of the wheelchair of FIG. 1.
Figure 14:
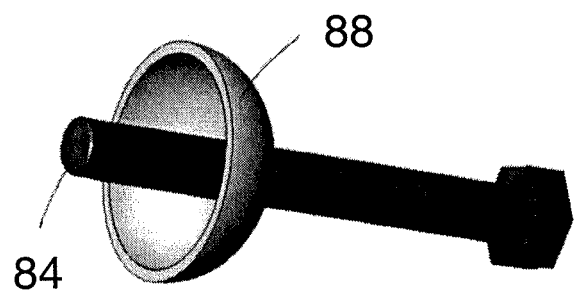
FIG. 14 shows another side perspective view of a portion of the rear hub assembly of the wheelchair of FIG. 1.
Figure 13:
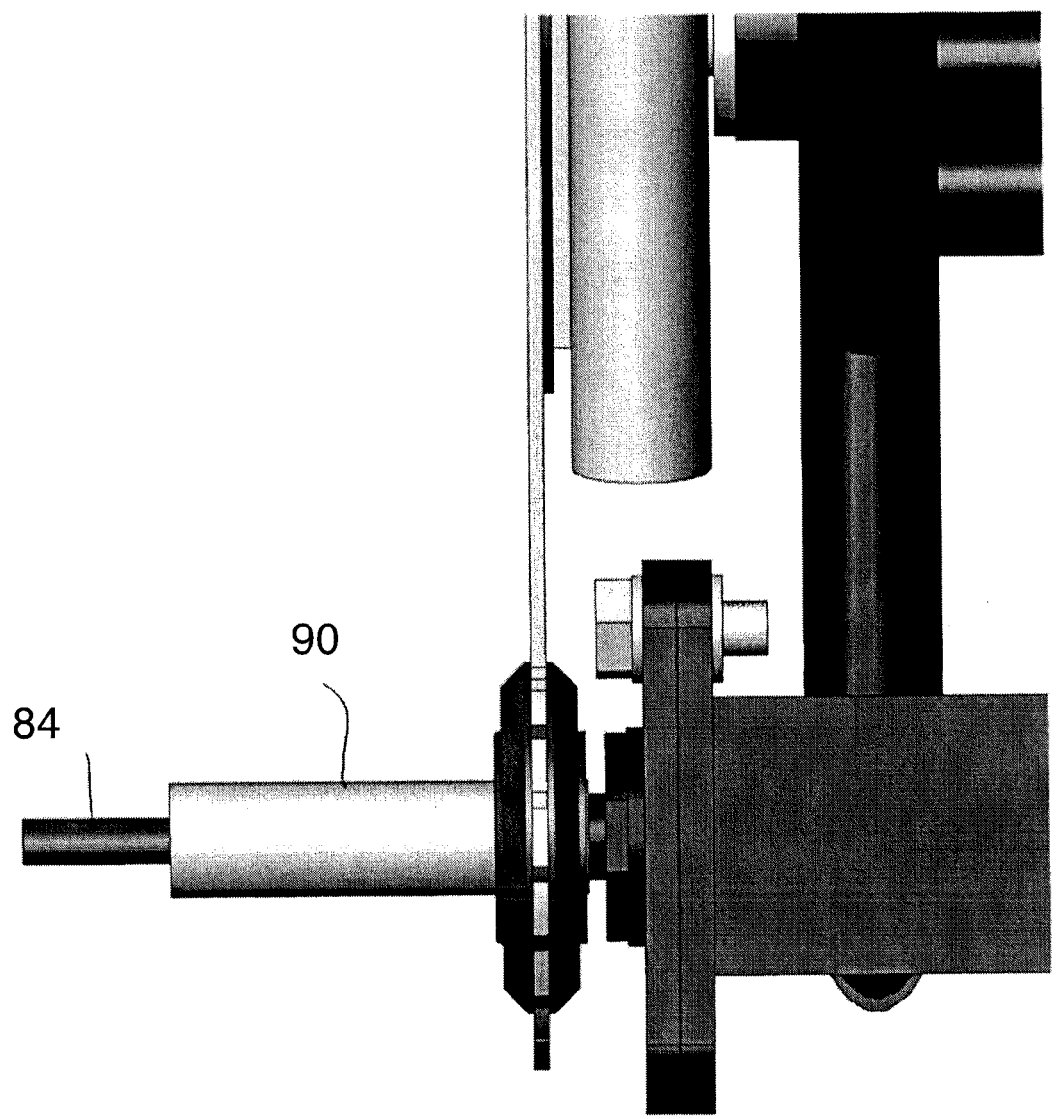
FIG. 13 shows another side view of portions of the lever assembly and rear hub assembly of the wheelchair of FIG. 1.
Figure 15:
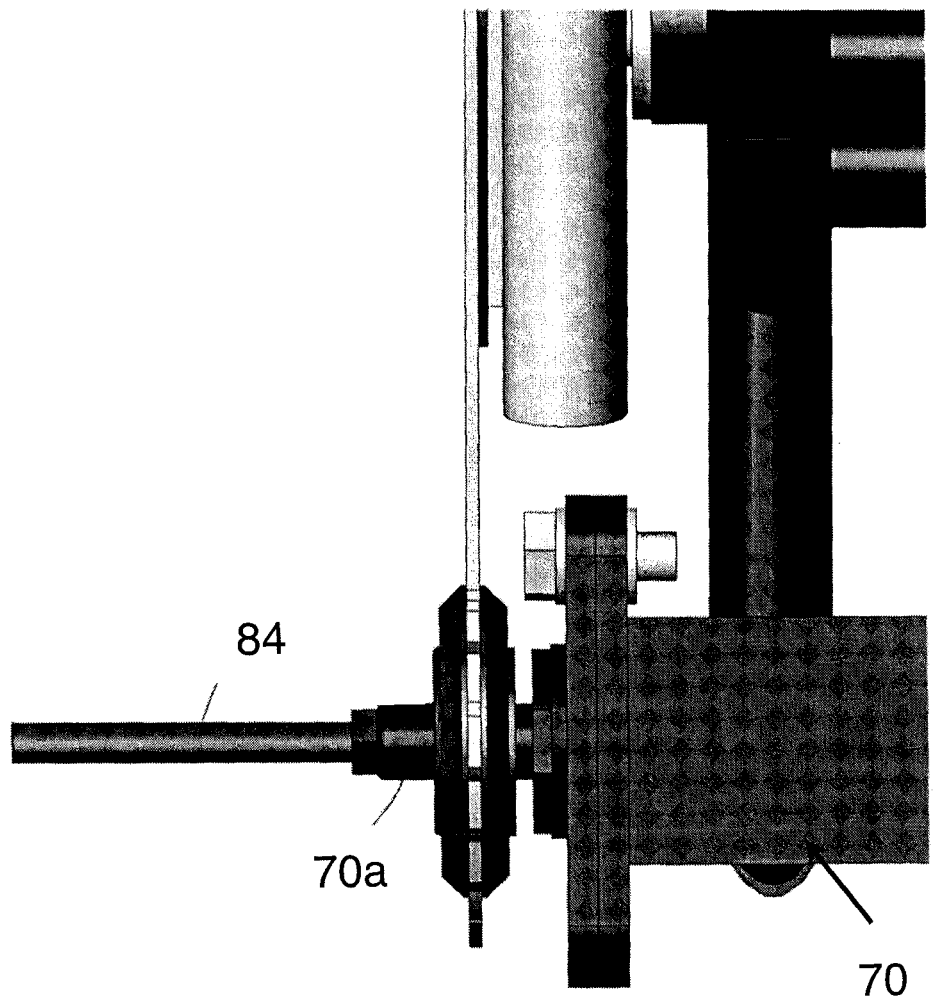
FIG. 15 shows another side view of portions of the lever assembly and rear hub assembly of the wheelchair of FIG. 1.

The description that now follows relates to wheel 14, although it will be appreciated that the same mechanism is used with respect to wheel 16 and thus is not specifically shown and described in detail with respect to that wheel. Referring next to FIGS. 2 and 3, the lever assembly of the exemplary preferred embodiment includes lever 20 coupled to lever coupling main tube 68 which in turn is coupled to a bottom bracket 70 disposed along axis 54. Lever 20 and lever coupling main tube 68 are keyed to one another to prevent relative rotation with respect to one another, thereby preventing lever 20 from spinning in tube 68 when brake 24 is applied. As shown in FIG. 10, lever coupling main tube 68 is fixed to chainring 72 by a lever coupling standoff plate 74. In the exemplary preferred embodiment, plate 74 is welded to chainring 72 and main tube 68 is welded to plate 74. In addition, as shown in FIG. 11, chain 76 rides on chainring 72 along with freewheel 78, the latter of which forms part of rear hub assembly 80. Details of rear hub assembly 80 are shown in FIGS. 11-14. In particular, rear hub assembly 80 includes a rear hub 82 and an M8 hub bolt 84. Hub bolt 84 preferably is welded to the axle 70a (e.g., axle 70a spins with the wheel 14) of bottom bracket 70. In the exemplary embodiment, bottom bracket 70 is a bottom bracket of a bicycle which includes axle 70a along with two angular contact bearings and associated retainer cups. Rear hub 82 may be accurately located to align chainring 72 with freewheel 78 by putting rear hub 82 on the axle 70a and subsequently threadably associating a nut onto the threaded portion of hub bolt 84. Hub bearing race 88, which is often connected to rear hub 82 when the hub is fabricated from a common bicycle hub, abuts the nut to position the hub correctly along the axle 70a. Another nut/washer/lock washer combination (not shown) may be disposed on the end of hub bolt 84 to fix rear hub 82 in place. In a preferred exemplary embodiment, an end portion of rear hub 82 is threadably associated with freewheel 78. Rear hub 82 preferably is connected to wheel 14a with spokes (not shown). Inside rear hub 82 is a 1 inch diameter hub insert 86 preferably formed of electrical conduit. Preferably, hub insert 86 is press-fit into rear hub 82. Hub insert 86 also is flanged at one end so that it can be welded to hub 82. One end of hub insert 86 abuts bearing race 88. Inside hub insert 86 is another hub insert 90 which preferably is a 0.5 inch diameter schedule 40 water pipe. Hub insert 90 preferably includes a longitudinal slit along the length thereof, so that the diameter of hub insert 90 may be compressed when it is being installed inside hub insert 86. Hub insert 90 is coupled to bottom bracket 70, and hub bolt 84 is welded to the axle 70a of bottom bracket 70, as shown for example in FIG. 15.

A bicycle hub is preferably used to make rear hub 82. During hub fabrication, all bearings are removed from rear hub 82, and a threaded rod at the center of rear hub 82 also is removed. Hub insert 86 is then press-fit into rear hub 82. Then hub insert 90, with an axle 70a already inside it, is pressed into hub insert 86 as to slightly expand hub insert 86 and provide a tight fit with respect to the axle 70a. Hub inserts 86 and 90 are preferably joined to rear hub 82 by welding proximate to the hub insert 86 flange.

Figure 16:
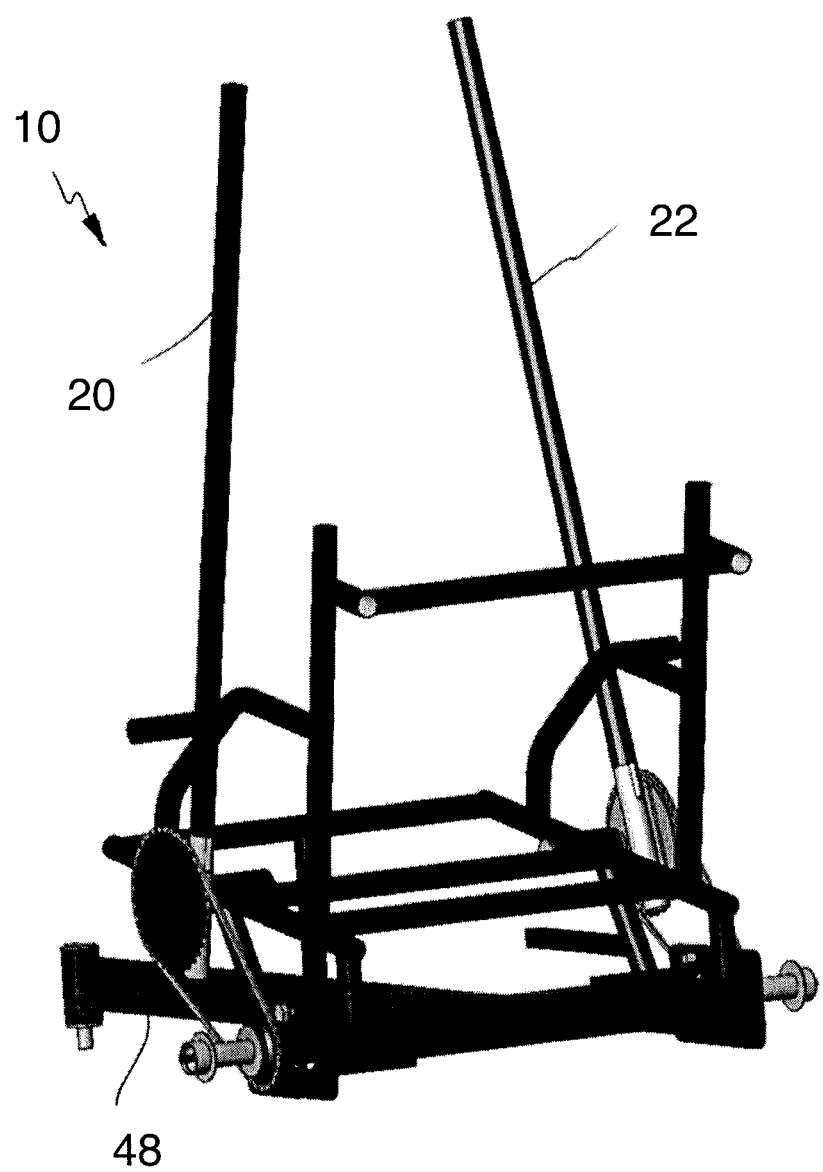
FIG. 16 shows a rear perspective view of a portion of the support structure of the wheelchair of FIG. 1.

As shown in FIG. 16, a tubular support structure may be provided for wheelchair 10. In the preferred exemplary embodiment, individual components of wheelchair 10 such as the tubular members shown in FIG. 16 are welded to one another.

The lever drivetrain of wheelchair 10 is designed to optimally convert upper body power of a person seated in the wheelchair for use in wheelchair propulsion in a wide range of terrains. For short-range mobility, such as in an office or around a bathroom, wheelchair 10 can be converted to a conventional wheelchair by simply removing levers 20, 22 which are demountably attached to wheelchair 10. For example, lever 20 is demountably attached to lever coupling main tube 68. This permits regular wheelchair functions to be performed such as backing-up.

Wheelchair 10 achieves a multi-speed, fixed gear ratio drivetrain with the lever system shown and described herein. Unlike most gear trains, which operate in varied states to obtain multiple ratios, the drivetrain of wheelchair 10 exists in only one state; it is the user who changes his or her hand position to change the mechanical advantage of the device. If more torque at the wheel is needed to climb a hill, the user simply slides his or her hands up the levers and away from the pivots. If more speed is required, the user moves his or her hands closer to the lever pivots, achieving a greater angular deflection with every push stroke. The relationship between chair speed and hand speed is represented by Eqn. 1 below:

$$\frac{V_{Chair}}{V_{Hand}} = \frac{D_{CR} R_W}{D_{FW} L}$$

where $V_{Chair}$ is the chair velocity, $V_{Hand}$ is the users hand velocity, $D_{CR}$ is the chainring diameter, $R_W$ is the wheel radius, $D_{FW}$ is the freewheel diameter, and L is the lever length.

The fixed gear ratio offers a number of advantages over a multi-speed gear train: (1) it does not require a derailleur, which is an expensive, unreliable, and fragile part in the developing world; (2) it enables the gear train to be lightweight; and (3) all rolling elements can be fabricated from bicycle parts that can be purchased in any developing country. In effect, every moving part of wheelchair 10 is likely to be locally available and repairable by bicycle technicians. Finally, the use of bicycle parts makes wheelchair 10 inexpensive to produce.

Wheelchair 10 is powered by pushing levers 20, 22 forward. Pulling levers 20, 22 back ratchets and resets the gear train for the next power stroke. This actuation scheme was chosen to enable people with a large range of disabilities to propel wheelchair 10. For example, a person with a spinal cord injury may not have control of his or her abdominal muscles. The pushing motion allows the rider to brace against the seat back, whereas a pulling power stroke could pull him or her out of the chair. Furthermore, pushing levers engages larger muscle groups than using conventional hand rims, resulting in a greater power output with less exertion. Braking is accomplished by pulling all the way back on levers 20, 22, past the minimum angle in the actuation return stroke. This forces the brakes 24, 26, shown as small tubes protruding orthogonally from levers 20, 22, to contact tires 14a, 16a. The braking motion does not tend to push the rider out of wheelchair 10, as the seat recline angle of about 10° also allows body weight to aid in pulling on levers 20, 22. Steering of wheelchair 10 is accomplished by either differentially powering or braking tires 14a, 16a.

The drivetrain configuration of wheelchair 10, for example, may have a 36-tooth chainring 72 and a 20-tooth freewheel 78. The most common chainring sizes available in developing countries are 52, 48, 44, 36, 32, and 28 teeth and common freewheel sizes are 22, 20, and 18 teeth. Advantageously, the 36/20 chainring/freewheel combination maximizes the operation range between high-speed and high-torque performance. A set of levers which can be grasped between 22 cm to 86 cm (so-called "lever lengths") from the pivot enables a user of wheelchair 10 to travel on virtually any terrain, the most common of which may be traversed at high speeds and efficiency.

In use, as chainring 72 is turned, chain 76 is engaged which turns freewheel 78. In turn, rear wheel 14 rotates. Because chainring 72 is 1.8 times larger than freewheel 78, the freewheel 78 turns 1.8 times as fast as chainring 72. This creates a gear ratio greater than one between levers 20, 22 and rear wheels 14, 16.

The position of rear wheels 14, 16 can be adjusted forwards and backwards using bolt plates 100, 102 as shown for example in FIG. 3.

A parking brake (not shown) optionally may be provided for wheelchair 10.

In the preferred exemplary embodiment, the lever system of wheelchair 10 achieves a 4:1 change in mechanical advantage.

In summary, wheelchair 10 achieves mechanical advantage when a user shifts his or her hands up and down levers 20, 22.

Advantages of wheelchair 10 including comparative performance data, can be found in Amos G. Winter, V, "The Design and Testing of a Low-Cost, Globally-Manufacturable, Multi-Speed Mobility Aid Designed for Use on Varied Terrain in Developing and Developed Countries," Proceedings of the ASME 2009 International Design Engineering Technical Conferences & Computers and Information in Engineering Conference, IDETC/CIE 2009, Aug. 30-Sep. 2, 2009, San Diego, Calif., the entire content of which is incorporated herein by reference thereto.

Figure 17:
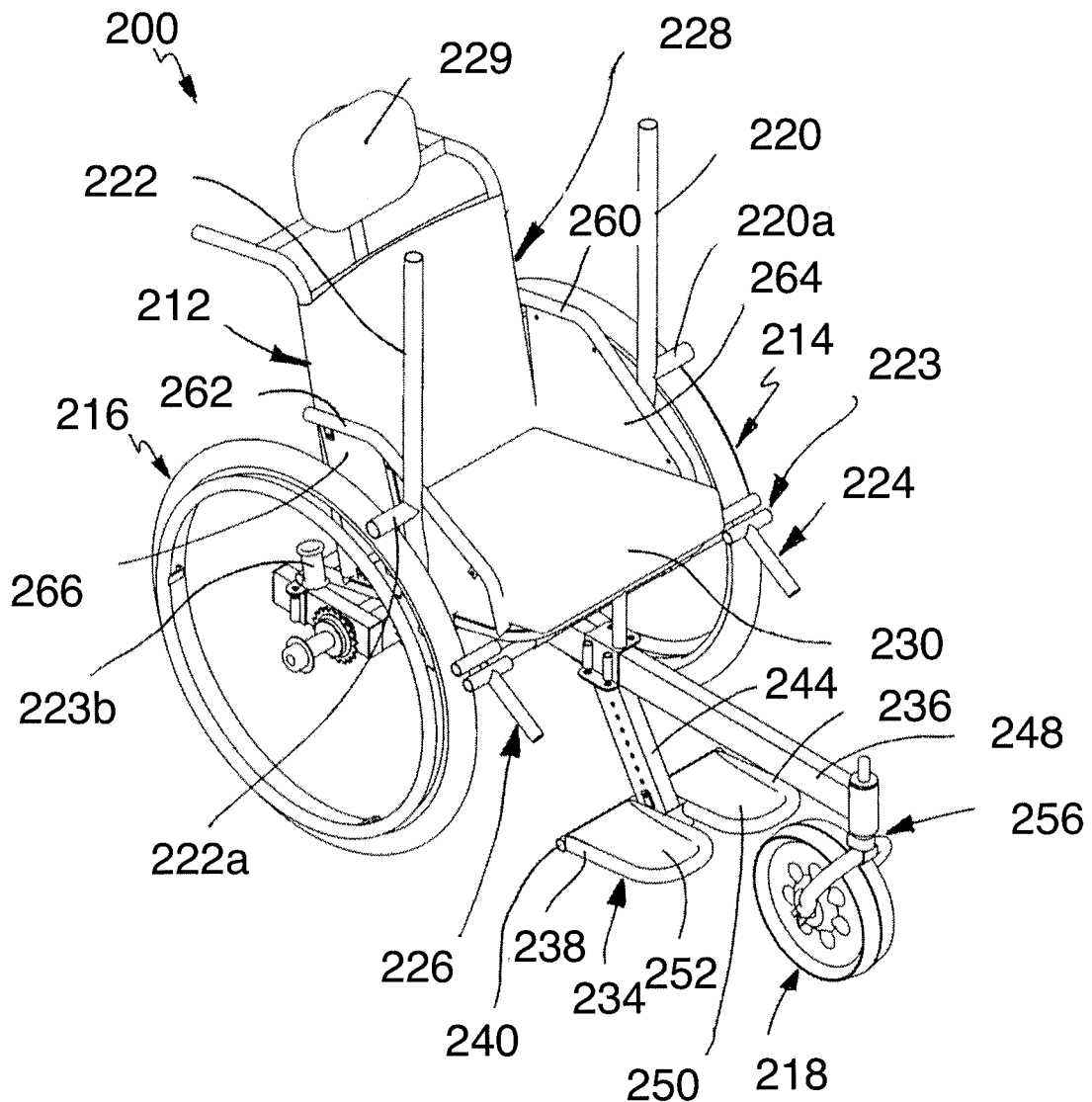
FIG. 17 shows a perspective view of a second embodiment of a wheelchair with lever drivetrain according to an exemplary embodiment.
Figure 21:
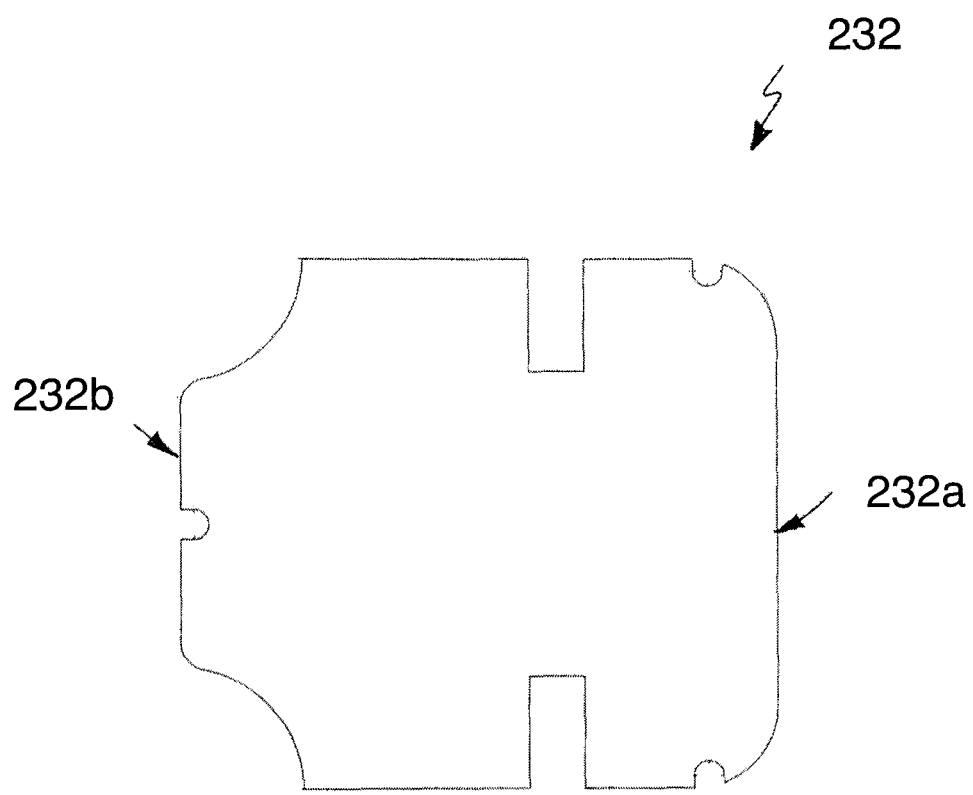
FIG. 21 is a top view of a rigid plate for the seat of the wheelchair of FIG. 1.
Figure 22:
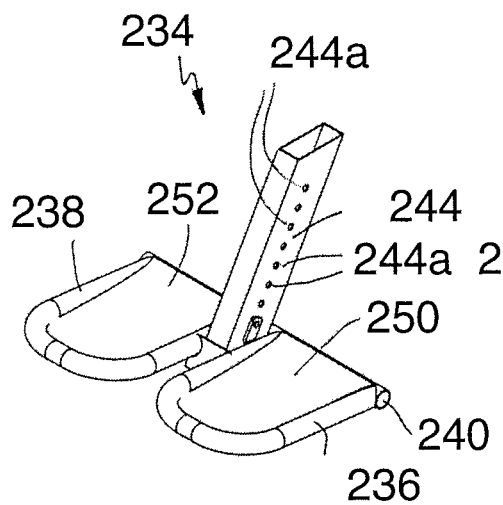
FIG. 22 shows a top perspective view of the foot rest of the wheelchair of FIG. 17.
Figure 23:
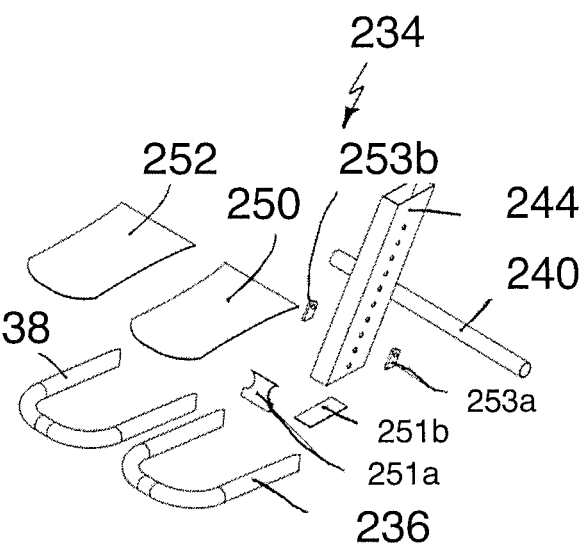
FIG. 23 shows an exploded perspective view of the foot rest of the wheelchair of FIG. 17.

Turning to FIG. 17, another exemplary embodiment of a wheelchair 200 is shown. Aspects of wheelchair 10 and wheelchair 200 are the same, including the mechanical advantage that may be achieved using a lever drivetrain, and thus the description above with respect to wheelchair 10 may be applied to wheelchair 200, with certain design differences as discussed below. Wheelchair 200 has a seat 212, rear wheels 214, 216, and a front wheel 218 (a caster). The drivetrain of wheelchair 200 includes a pair of levers 220, 222 for hand operation. Each lever 220, 222 includes a brake 220a, 222a, respectively, for frictionally engaging a wheel 214, 216, respectively. As shown for example in FIG. 17, levers 220, 222 of wheelchair 200 are deployed and in position for a user to actuate them for power strokes as explained previously with respect to wheelchair 10 (i.e., the levers are not stored, as will be described later, to allow the wheelchair to operate as a traditional wheelchair without levers). Wheelchair 200 achieves mechanical advantage when a user shifts his or her hands up and down levers 220, 222. In the preferred exemplary embodiment of wheelchair 200, the lever system achieves a 3:1 change in mechanical advantage. Although not shown, in an exemplary preferred embodiment, wheels 214, 216 may include spokes. Seat 212 may include a seat back portion 228, a back pad 229, and a cushion portion 230 which may be disposed on a rigid plate 232 as shown in FIG. 21. Rigid plate 232, which for example may be formed of wood, may include a front edge 232a proximate parking break 223 as well as a back edge 232b proximate seat 212. Parking break 223 includes parking break levers 224, 226.

Back pad 229 preferably is a small pad disposed above seat back portion 228, that contacts the wheelchair user between the shoulder blades. The function of back pad 229 is to support the user's upper torso and direct reaction forces from pushing on levers 220, 222 into the chair's frame. Wheelchair 200 thus is different from wheelchair 10 inasmuch as in the embodiment of wheelchair 10, seat back portion 28 extends only to proximate the bottom of a user's shoulder blades. If a user does not have sufficient abdominal strength, pushing on levers 20, 22 of wheelchair 10 would cause a reaction force at the user's shoulders, and thus a cantilevered load on the user's torso. The user's back may arch over the top of seat back portion 28 and his or her hips may kick forward, thus necessitating continual readjustment of seating position. Back pad 229 thus is provided to support a user's upper torso like essentially a bench press bench. Reaction forces from levers 220, 222 that travel through a user's shoulders are directed into back pad 229. The back pad 229 applies an equal and opposite reaction force and mitigates any cantilevered loads applied to the torso, enabling a user to maintain correct posture and seating position.

Parking brake 223 on wheelchair 200, shown for example in FIGS. 36-37, is formed of a piece of tubing that serves as a cross-member 223a, spans underneath the seat, and turns on two bushings 223b, 223c whose position is limited by stops 223d, 223e, respectively. The bushings clamp to the underside of the seat frame and allow the brake to be adjusted forward and aft. At each end of the spanning tube are two additional pieces of tubing, parking break ends 225a, 225b, that make contact with the tire when the brake is engaged. The pieces of tubing are offset 90° circumferentially from each other. FIG. 37 for example shows parking brake 223 in side view along with parking break lever 224, parking break ends 225a, bushing 223b, and stop 223d shown end-on. Two brake handles extend perpendicularly from the tire contact tubes. The brake is operated by pulling one or both of the brake handles upward. As the brake rotates, the tire contact tubes rotate and make contact with the tire. When both tire contact tubes on each side are touching the tires, and are equally compressing the tire, the brake assembly is in an energy minimum. Further rotation of the assembly in either direction causes more compression of the tire, and more potential energy stored in the system. Thus, the brake system is bistable, with one energy minimum when the brake is "on" and one when it is "off." When "on," the potential energy minimum of the system makes the chair resistant to rolling forwards or backwards. In an exemplary embodiment, bushings 223b, 223c are formed from ⅞ inch, 18 gauge pipe while other components of parking break 223 are made from ¾ inch, 18 gauge pipe, components being welded together to form the parking break. As shown in FIG. 37, the bar extending horizontally is 226 or 224. The three circles clustered together are composed of 225b or 225a at the bottom and 223d at the center with 223c or 223b wrapped around it.

Figure 26:
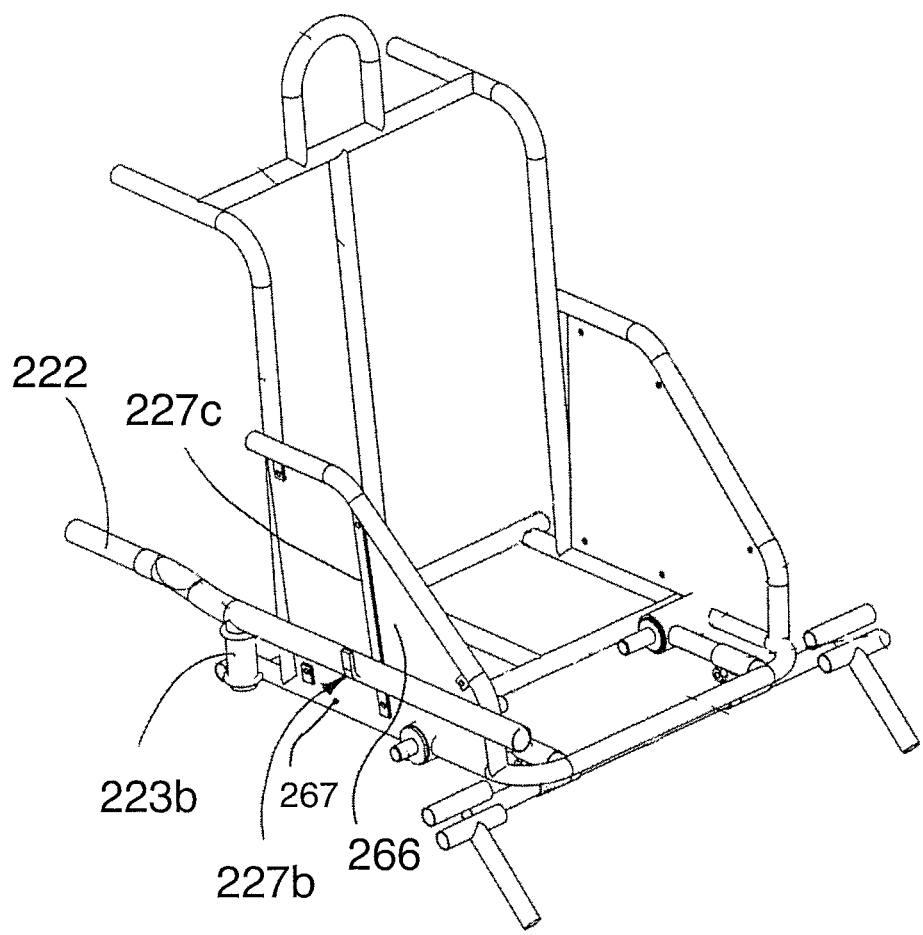
FIG. 26 shows a side perspective view of the frame assembly of the wheelchair of FIG. 17.
Figure 27:
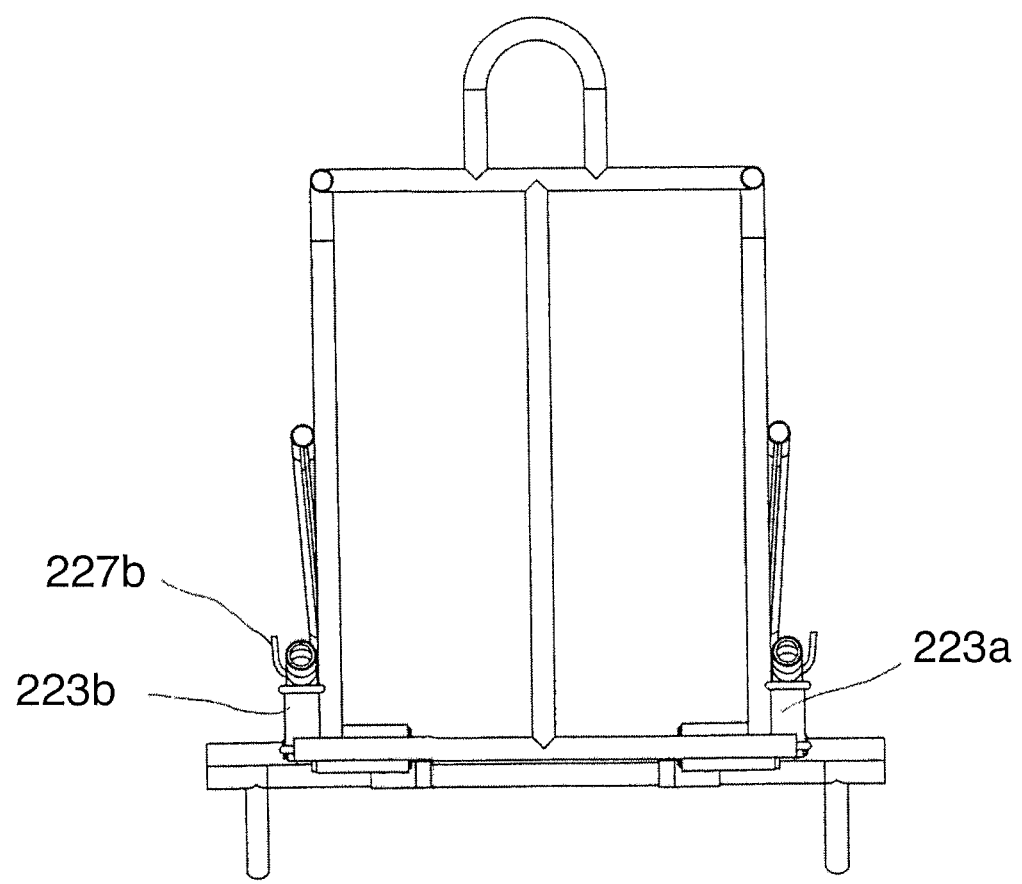
FIG. 27 shows a front view of the frame assembly of the wheelchair of FIG. 17.
Figure 32:
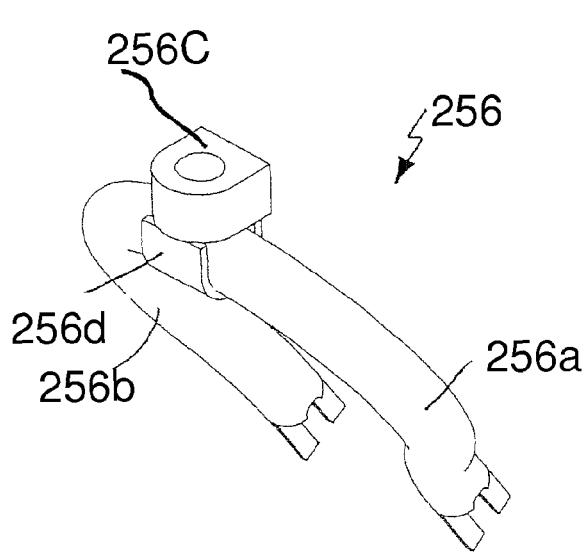
FIG. 32 shows a top perspective view of the fork assembly of the wheelchair of FIG. 17.
Figure 33:
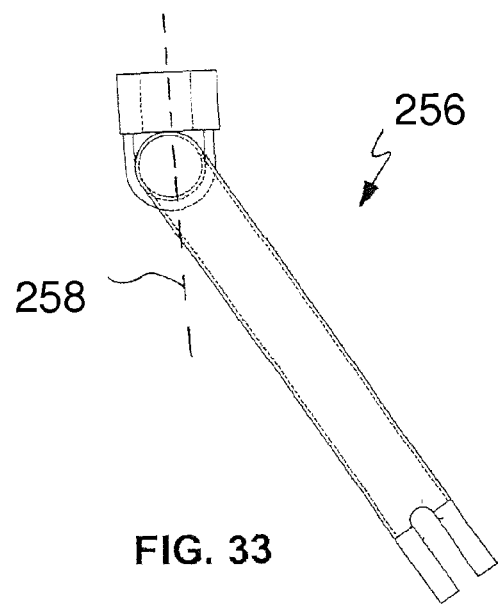
FIG. 33 shows a side perspective view of the fork assembly of the wheelchair of FIG. 17.

A shown for example in FIG. 26, wheelchair 200 provides for levers 220, 222 to be stored on the sides of the chair frame, just above the drivetrain and between the wheel and armrest frame. Advantageously, each of levers 220, 222 may be held in place by slipping the brake bar 220a, 222a into a respective cylinder 223a, 223b that is welded to the rearmost section of the seat frame assembly. The lever's brake bar 220a, 222a is a short bar protruding perpendicularly to each of main lengths of levers 220, 222, respectively. When the lever is attached to the drivetrain and pulled backwards fully, the bar rubs against the tire to act as a brake. A separate hook cradles an upper part of each lever when in storage position. For example, hook 227b is attached to a structural member 227c that may span vertically across mud guard 266 from armrest tube 262 to the seat pan tube 267.

When in storage position, the bottom portions of the levers are contained within the envelope of the rear wheels. This prevents levers 220, 222 from scraping against walls or other objects/people when a user turns wheelchair 200. The top portions of levers 220, 222 may extend beyond the arm rest tubes and beyond the front edge of the seat cushion, with the curvature of levers 220, 222 tangent to the top surface of the seat cushion. In one exemplary embodiment, about 2 inches of each of levers 220, 222 that extend along the side of the seat cushion creates bars which the user can grab when transferring into wheelchair 200. The storage system for levers 220, 222 is designed such that if a downwards force is applied to the end of the lever, the resulting moment on the lever, with the fulcrum at the hook holding the body of the lever, causes it to jam in the cylinder holding the brake bar. This provides a solid handle for a user when transferring into wheelchair 200. When a user wants to remove the lever, he or she simply lifts the lever 220, 222 upward, which causes it to lift out of the hook and slide easily out of the cylinder holding the brake bar. Because the lever is positioned on the side of the chair frame, the user can easily see and grasp it without moving his or her torso. This makes storing and removing levers 220, 222 very easy.

Figure 24:
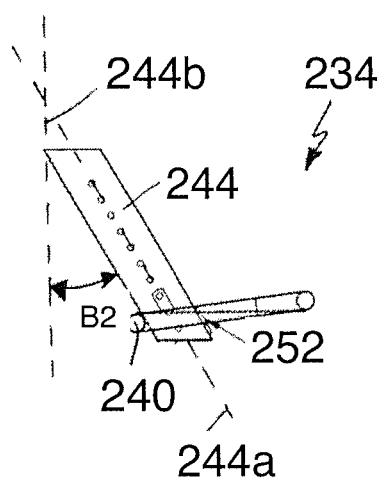
FIG. 24 shows a side view of the foot rest of the wheelchair of FIG. 17.
Figure 25:
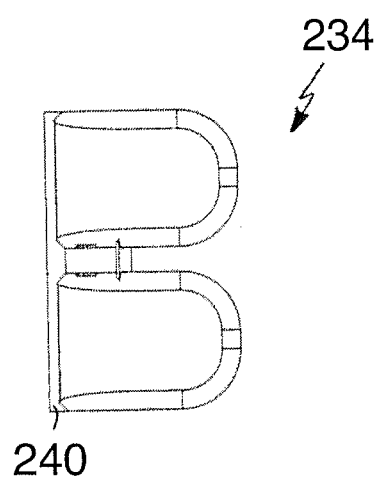
FIG. 25 shows a top view of the foot rest of the wheelchair of FIG. 17.

A foot rest 234 for example may be formed of a pair of U-shaped tubes 236, 238 coupled to each other with a cross-brace tube 240. In alternate embodiments, tubes 236, 238 instead each may form a V-shape, an O-shape, a square or other rectangular shape, or another shape. Footrest support 244 couples cross-brace tube 240 to central member 248. Foot rest plates 250, 252 are configured and dimensioned to be coupled to U-shaped tubes 236, 238, respectively. As shown for example in FIG. 18, U-shaped tubes 236, 238 of foot rest 234 may be disposed at an angle transverse to central member 248, although plates 250, 252 optionally may be disposed parallel to the ground. As shown for example in FIG. 24, plates 250, 252 may be disposed parallel to the ground and at an angle $\beta_1$ of 60° with respect to central axis 244a of footrest support 244. Foot rest position is adjustable, with foot rest clamps 253a, 253b abutting opposing sides of footrest support 244 such that a bolt (not shown) may pass through any of holes 244a in footrest support 244 and couple foot rest clamps 253a, 253b and footrest support 244 thereby supporting U-shaped tubes 236, 238 and cross-brace tube 240 at a user-selected height with respect to the ground. In one embodiment, holes 244a permit adjustment in ¾ inch increments. A front locator plate 251a is slidable with respect to footrest support 244 to facilitate height adjustment. A cap 251b also may be provided to seal the bottom of footrest support 244. In one exemplary preferred embodiment, footrest support 244 is disposed at an angle $\beta_2$ of 30° with respect to a vertical axis 244b as shown. The curved tubing forming U-shaped tubes 236, 238 that protects a user's toes rises above the plane of foot rest plates 250, 252 in the front, but drops below that plane in the back as shown for example in FIG. 24. This is to provide a smooth, large-radius edge at the rear edge of the foot rest, so barefoot users don't cut their feet. Tubes 236, 238 for example may be made of ¾ inch diameter tubing (18 gauge). Preferably, components of foot rest 234 are formed of steel and welded to one another.

In the preferred, exemplary embodiment, wheelchair 200 has a total of three wheels: rear wheels 214, 216, and front wheel 218. Wheel 214 may include tire 214a and hand rim 214b, while wheel 216 similarly may include tire 216a and hand rim 216b. Hand rims 214b, 216b may be grasped by a user sitting in wheelchair 200 to turn wheels as is generally known in the art. Preferably, wheels 214, 216 are disposed parallel to one another perpendicular to rotation axis 254 and preferably are 24 inch diameter mountain bike tires. Other alternate embodiments may include cambered wheels, as is common on wheelchairs. Wheel 218 may be an 8 inch or 10 inch diameter castor (in which a hub such as a bicycle hub may be disposed to serve as the bearing for front wheel 218), and preferably is secured by a fork 256 that may have a horseshoe-shaped portion including legs 256a, 256b of unitary construction that may be formed of ⅞ inch, 18 gauge tubing. Legs 256a, 256b may be coupled with a crank arm connection 256c and strap 256d. Front wheel 218 is provided with 360° of swivel movement via crank arm connection 256c disposed on swivel axis 258. Components of fork 256 may be formed of steel and welded together. The three points of ground contact provided by rear wheels 14, 16 and front wheel 18 advantageously provide stability to wheelchair 10 on rough terrain and thus resistance to tipping, as compared to a design optionally with a fourth wheel. Preferably, wheel 18 is disposed a sufficient distance on member 248 from axis 254 about which wheels 214, 216 rotate, such that wheelchair 200 is stable. Preferably, a long "wheelbase" is provided for stability and also for decreasing the loading on front wheel 218. Wheelchair 10 may further include arm rests 260, 262 as well as respective mud guards 264, 266.

Figure 34:
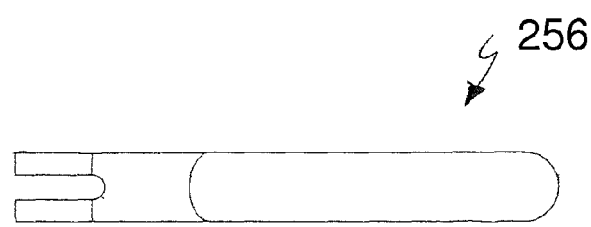
FIG. 34 shows a side view of a leg in the fork assembly of the wheelchair of FIG. 17.
Figure 35:
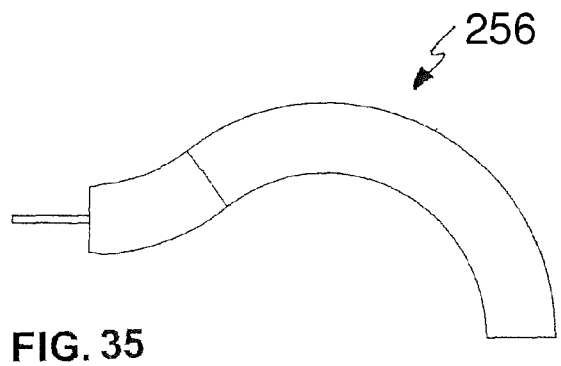
FIG. 35 shows a front view of a leg in the fork assembly of the wheelchair of FIG. 17.

FIG. 34 shows a side view of one of the fork legs 256a, 256b (which are the same part, just flipped when welded into fork assembly 256). FIG. 35 is a front view of one of fork legs 256a, 256b.

Exemplary levers 220, 222 are shown for example in FIGS. 29-31. Exemplary lever 220, shown for example in FIG. 29, preferably includes a first portion 221a formed of 1 inch outer diameter, 18 gauge tubing as well as a second portion 221b formed of a 0.5 inch schedule 40 water pipe. FIG. 30 shows how chainring 229 is coupled to a lever 220, 222. FIG. 31 shows an exploded view of the coupling assembly. The standoff plate 231a, a coupling tube 231b, and a coupling guard 231c are welded to chainring 229 to form the female portion of the coupling. A coupling lock key 231d is welded to levers 220, 222, and with second portion 221b forms the male portion of the coupling. Levers 220, 222 are coupled to chainring 229 by inserting second portion 221b into coupling tube 231b. Orientation of levers 220, 222 relative to chainring 229 is maintained via lock key 231d residing in the slot of coupling tube 231b.

It will be appreciated that wheelchair 200 may have a lower center of gravity as compared to wheelchair 10. In particular, wheelchair 200 has its center of gravity 5 inches lower than that of wheelchair 10. This may be accomplished by lowering the seat surface by 4 inches, and switching from 26 inch rear wheels to 24 inch rear wheels. The lower center of gravity advantageously improves backwards tipping stability. Lowering the center of gravity without moving it forward or aft improves backwards tipping stability without affecting side slope stability. For traveling on a side slope (e.g., consider travelling down a street that is crowned for drainage), the more forward the center of gravity is from the center of the rear wheels, the greater the torque acting on the wheelchair frame to steer it downhill and down the side slope. Thus, for side slope stability, it is desirable that the center of gravity of the wheelchair be as close back to the center of the rear wheels as possible, but for tipping stability it is desired that the center of gravity be as low as possible. The embodiment of wheelchair 200 realizes a compromise between side slope stability and tipping stability.

As compared to wheelchair 10, the drivetrain used in wheelchair 200 differs as follows. The drivetrain of wheelchair 10 employs a 36 tooth chainring (gear about which the lever pivots) driving a 20 tooth freewheel (at the center of the wheel) turning a 26 inch wheel. In contrast, the drivetrain used in wheelchair 200 has a 28 tooth chainring driving an 18 tooth freewheel turning a 24 inch wheel. This change results in a 25% increase in force applied between the wheel and the ground for a given pushing force and hand position on the levers and permits better hill climbing functionality because it gives the user better mechanical advantage. Although not shown, a chain rides on each chainring and freewheel as described previously with respect to wheelchair 10. In addition, the preferred lever length used for wheelchairs 10 and 200 differs. In one embodiment, the levers used with wheelchair 10 are 80 cm long, but with such a length users rarely used the upper 20 cm of the levers. Moreover, that upper section provides only a small amount of extra torque to the drivetrain. In contrast, the levers used with wheelchair 200 are 20 cm shorter, having a length of 60 cm from the pivot to the end. The usable hand position range of such levers is 20 cm from the pivot to 60 cm from the pivot, accounting for a 3:1 change in mechanical advantage.

Wheelchair 10 is about 3.5 inches wider than standard wheelchairs on the market in developing countries. This presents a challenge for using wheelchair 10 indoors as a normal wheelchair when the levers are removed. Thus, in contrast, the overall width of wheelchair 200 has been reduced as compared to wheelchair 10 as follows. The tires preferably used with wheelchair 200 are hybrid bicycle tires rather than knobby mountain bike tires, thus reducing the wheelchair width by 0.5 inches on each side. In addition, the ends of the new levers are jogged by 0.5 inch as seen for example in FIG. 29. The jog positions the upper portion of the lever (the part that is grasped by the user) directly over the drive chain, allowing the drive chain, and thus the entire wheel and drivetrain assembly, to be positioned 0.5 in closer to the seat frame than in the embodiment of wheelchair 10. This modification reduces the wheelchair width by 0.5 in on each side. Further, in wheelchair 200, the arm rest tubes taper inwards toward the front of the wheelchair. The arm rest tubes are connected to the outside of the seat back tubes and terminate in the front of the wheelchair by connecting to the center of the seat pan frame side tubes. Advantageously, this permits the seat to be wider near the rider's hips (the widest part of the body), but narrower near his or her legs. Narrowing near the legs allows sufficient clearance between the armrest tubes and wheels for the swing path of the levers, while maintaining a sufficiently wide seat width at the hips. This modification reduces overall width by 0.75 inch per side. In sum, the net result of the width reductions realized in the embodiment of wheelchair 200 is a 3.5 inch decrease in overall width. Thus, wheelchair 200 is the same width, or narrower, than competing wheelchair designs in developing countries.

Wheelchair 200 also has a different hub/axle design as compared to wheelchair 10. In particular, the axle of wheelchair 10 may be susceptible to fatigue problems. That axle may be formed by welding an M-8 bolt to the end of a bicycle bottom bracket axle. The threaded end of the bolt is then used to secure the hub. However, deflections of the bolt during wheelchair uses may cause stresses beyond the infinite life fatigue strength, and over time the bolt may break.

The axle used in wheelchair 200 may be made by welding the body (not head) of a ⅝ inch bolt onto the end of a bottom bracket axle (which is also ⅝ inch in diameter). The abutting ends of the bolt and axle may be chamfered into a cone to allow sufficient weld penetration into both metals. The weld preferably is formed at sufficiently high heat to ensure proper heat penetration, so that the axle is not too brittle. After welding, the weld preferably is ground flush to the surface of the bolt and axle. The end of the bolt then may be cut off to the correct length.

The following steps describe an exemplary method of making the hub of wheelchair 200:

(1) A bicycle hub is disassembled, leaving the hub body and flanges only.

(2) A piece of half inch, schedule 40 water pipe is cut to length to form the inner part of the hub.

(3) The water pipe is marked and cut axially, resulting in a C-shape cross-section. The resulting cut is then de-burred.

(4) A ⅝ inch bolt (which is the same diameter as the axle) is wrapped in paper, which forms a shim. In an exemplary embodiment, three layers are used. The paper-wrapped bolt is then inserted into the section of water pipe.

(5) The water pipe is clamped in a vice, which closes the slot cut in it. The edges of the slot are pounded with a hammer to bring them flush to the bolt.

(6) The slot is welded shut along the length of the water pipe section and then ground flush. The bolt is then removed.

(7) Two 1 inch long bushings are cut with a pipe cutter from 1 inch, 18-gauge mild steel tube stock.

(8) The resulting components to make the entire hub are the hub body, section of water pipe, two bushings, and a bolt on which everything is welded together.

(9) The two bushings act as spacers to center the water pipe section within the hub body. The burs remaining on the inside edge of the bushings create an interference fit when they are pushed onto the water pipe. The outer edges of the bushings contact the inner surfaces of the hub flanges, centering the bushings and water pipe within the hub.

(10) The final hub manufacturing step is to weld the water pipe section to the spacer bushings to the hub flange.

After the hub and axle are completed, the hub is put onto the axle in its correct axial orientation. A hole may be drilled perpendicular to the axle, through the end of the hub and axle. A cotter pin may be inserted into this hole and affixes the hub to the axle in the correct axial position. The cotter pin, for example, may be made from bicycle spokes which are readily available.

Preferably, the hub is exactly constrained to the axle. The interface between the axle and hub bore provides four radial constraints, and the cotter pin provides the fifth axial constraint and sixth circumferential constraint. This exactly constraints the hub allowing it to rotate with the axle on the axle bearings. A quick release design is provided; simply removing the cotter pin allows for the hub to slide off the axle without any tools being required.

The embodiment of wheelchair 200 further differs from the embodiment of wheelchair 10 with respect to chain tension and seat adjustment. In particular, wheelchair 10 includes rear wheels that may be adjusted forward and aft on two bolt plates. This design can be relatively heavy. In contrast, adjustment may be possible with wheelchair 200 by sliding the seat frame along the lower T-frame constructed from box tubing. The seat frame is affixed to the T-frame by three bolted clamps: two behind the seat and one in the middle of the front of the seat. Unbolting these clamps allows the seat to slide forward and aft to adjust chain tension and position the center of gravity to a user's preference. Also, in wheelchair 200, the rear wheel bearing housings are permanently affixed to the T-frame. The bearing housing are welded to the top of the "T" as well as longitudinal bars used to clamp the rear of the seat.

A substantial reduction in overall wheelchair weight from the embodiment of wheelchair 10 to the embodiment of wheelchair 200 is possible, on the order of one-third reduction. Such a weight savings may be achieved due to the aforementioned clamp system of seat adjustment as well as by reducing the tubing size for the seat structure to ¾ inch diameter instead of 1 inch diameter. Wheelchair 200 preferably is about the same weight as wheelchairs used in developing countries which weigh between 38 and 45 lbs.

While various descriptions of the present invention are described above, it should be understood that the various features can be used singly or in any combination thereof. Therefore, this invention is not to be limited to only the specifically preferred embodiments depicted herein.

Further, it should be understood that variations and modifications within the spirit and scope of the invention may occur to those skilled in the art to which the invention pertains. For example, a four-wheeled version of wheelchair 10, 200 could be used. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:

1. A manually powered wheelchair comprising:
a first lever associated with a first wheel and a second lever associated with a second wheel;
a first brake positioned on the first lever for engaging the first wheel and a second brake positioned on the second lever for engaging the second wheel; and
a first drivetrain to which the first lever is demountably coupled and a second drivetrain to which the second lever is demountably coupled, each drivetrain providing its respective lever with pivotal movement to propel the wheelchair only when the levers are pushed forward and to permit the brake on each lever to come in contact with the respective wheel when each lever is pulled backward beyond a predetermined angle;
wherein each of the first and second drivetrains include a chainring, a chain, and a freewheel, and each drivetrain has a fixed gear ratio; and
wherein the freewheel of each of the first and second drivetrains is actuated by manual pivoting of the lever associated therewith.

2. The wheelchair of claim 1, further comprising a single front wheel.

3. The wheelchair of claim 1, wherein the first lever when pivoting backwards within the predetermined angle permits a resetting of the first drivetrain for a next power stroke; and the second lever when pivoting backwards within the predetermined angle permits a resetting of the second drivetrain for a next power stroke.

4. The wheelchair of claim 1, further including a separate axle for each of the first and second wheels.

5. The wheelchair of claim 1, wherein the freewheel has 20 teeth.

6. The wheelchair of claim 5, wherein the chainring has 36 teeth.

7. The wheelchair of claim 1, wherein the freewheel has 18 teeth.

8. The wheelchair of claim 7, wherein the chainring has 28 teeth.

9. The wheelchair of claim 1, wherein the drivetrains permit a 4:1 change in mechanical advantage.

10. The wheelchair of claim 1, wherein the drivetrains permit a 3:1 change in mechanical advantage.

11. The wheelchair of claim 1, further comprising a footrest.

12. The wheelchair of claim 1, wherein the first and second wheels are disposed parallel to one another.

13. The wheelchair of claim 1, wherein a wheelbase of between about 60 cm and about 80 cm is provided between a front wheel and the first and second wheels.

14. The wheelchair of claim 1, further comprising a back pad configured and dimensioned for being disposed between shoulder blades of a user of the wheelchair.

15. The wheelchair of claim 1, further comprising a seat frame that is tapered such that the seat frame is wider proximate a user's hips than proximate the user's legs.

16. A manually powered wheelchair comprising:
a first lever associated with a first wheel and demountably coupled to a first drivetrain, the first lever having a first brake thereon;
a second lever associated with a second wheel and demountably coupled to a second drivetrain, the second lever having a second brake thereon;
a pair of drivetrains, each drivetrain having a chainring, a chain, and a freewheel, and each drivetrain has a fixed gear ratio; and
wherein the freewheel of each drivetrain is actuated by manual pivoting of the lever associated therewith;
a first cylinder for receiving the first brake and a first bracket for supporting a first main body of the first lever; and a second cylinder for receiving the second brake and a second bracket for supporting a second main body of the second lever.

17. A method of operating a wheelchair, the method comprising:
providing a wheelchair having a first lever associated with a first wheel a second lever associated with a second wheel, a first brake positioned on the first lever for engaging the first wheel and a second brake positioned on the second lever for engaging the second wheel, and a first drivetrain to which the first lever is demountably coupled and a second drivetrain to which the second lever is demountably coupled, each drivetrain providing its respective lever with pivotal movement to propel the wheelchair only when the levers are pushed forward and to permit the brake on each lever to come in contact with the respective wheel when each lever is pulled backward beyond a predetermined angle, the method further comprising:
changing hand position on the levers to change mechanical advantage.

18. The method of claim 17, further comprising: moving hand position closer to a pivot point associated with the first lever to increase speed achieved by a power stroke.

19. The method of claim 17, further comprising: moving hand position away from a pivot point associated with the first lever to increase torque at the first wheel.

20. The method of claim 17, wherein hand position may be set over lever lengths between about 20 cm and about 86 cm.

21. The method of claim 17, wherein hand position may be set over lever lengths between about 20 cm and about 60 cm.

22. The method of claim 17, wherein a wheelbase of between about 50 cm and about 80 cm is provided between a front wheel and the first and second wheels.

23. The method of claim 17, wherein the drivetrains permit a 4:1 change in mechanical advantage.

24. The method of claim 17, wherein the drivetrains permit a 3:1 change in mechanical advantage.

25. The method of claim 17, wherein each drivetrain has a fixed gear ratio.

26. The method of claim 17, wherein a freewheel is actuated by manual pivoting of the first lever.

27. The method of claim 17, wherein the wheelchair is moved by differentially powering at least one of the levers or applying at least one of the brakes.

28. A manually powered wheelchair comprising:
a first lever associated with a first wheel and demountably coupled to a first drivetrain, the first lever having a first brake thereon, and is pivotally movable to permit the first brake to come in contact with the first wheel when the first lever pivots backward beyond a predetermined angle;
a second lever associated with a second wheel and demountably coupled to a second drivetrain, the second lever having a second brake thereon, and is pivotally movable to permit the second brake to come in contact with the second wheel when the second lever pivots backward beyond a predetermined angle; and a first cylinder for receiving the first brake and a first bracket for supporting a first main body of the first lever; and a second cylinder for receiving the second brake and a second bracket for supporting a second main body of the second lever;

wherein each of the first and second drivetrains include a chainring, a chain, and a freewheel, and each drivetrain has a fixed gear ratio; and wherein the freewheel of each of the first and second drivetrains is actuated by manual pivoting of the lever associated therewith.

29. A manually powered wheelchair comprising:

a first lever associated with a first wheel and a second lever associated with a second wheel;

a first drive train to which the first lever is demountably coupled and a second drivetrain to which the second lever is demountably coupled, each drivetrain providing its respective lever with pivotal movement to propel the wheelchair only when the levers are pushed forward;

a first brake fixedly positioned on the first lever and a second brake fixedly positioned on the second lever, such that each brake moves along with its respective lever when each lever is pivotally pulled backward beyond a predetermined angle to permit the brake on each lever to frictionally engage the respective wheel.

* * * * *